(12) United States Patent
Tsusaka et al.

(10) Patent No.: US 7,747,351 B2
(45) Date of Patent: Jun. 29, 2010

(54) APPARATUS AND METHOD FOR CONTROLLING ROBOT ARM, AND ROBOT AND PROGRAM

(75) Inventors: Yuko Tsusaka, Osaka (JP); Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/594,696

(22) PCT Filed: Jun. 24, 2008

(86) PCT No.: PCT/JP2008/001632

§ 371 (c)(1),
(2), (4) Date: Oct. 5, 2009

(87) PCT Pub. No.: WO2009/001550

PCT Pub. Date: Dec. 31, 2008

(65) Prior Publication Data

US 2010/0087955 A1    Apr. 8, 2010

(30) Foreign Application Priority Data

Jun. 27, 2007   (JP) .............................. 2007-169115

(51) Int. Cl.
*G06F 19/00* (2006.01)
(52) U.S. Cl. .................. 700/245; 700/90; 700/253; 700/257; 700/264; 177/25.11; 177/26; 177/30; 177/31; 177/34; 318/568.11; 318/568.14; 318/568.16; 318/568.2; 318/568.22; 382/153; 623/57; 623/59; 623/60; 623/64; 623/65; 901/2; 901/8; 901/14; 901/19; 901/46

(58) Field of Classification Search .................. 700/90, 700/245, 253, 257, 264
See application file for complete search history.

(56) References Cited

U.S. PATENT DOCUMENTS

| 5,994,864 | A  | * | 11/1999 | Inoue et al. ............... 318/568.2 |
| 6,204,619 | B1 | * | 3/2001 | Gu et al. ................. 318/568.11 |
| 6,394,731 | B1 | * | 5/2002 | Konosu et al. .................. 414/5 |
| 6,522,952 | B1 | * | 2/2003 | Arai et al. .................... 700/258 |
| 6,654,665 | B2 | * | 11/2003 | Arai et al. .................... 700/258 |
| 7,112,938 | B2 | * | 9/2006 | Takenaka et al. ........ 318/568.12 |
| 7,443,115 | B2 | * | 10/2008 | Okamoto et al. ............. 318/100 |

(Continued)

FOREIGN PATENT DOCUMENTS

JP    9-154900    6/1997

(Continued)

OTHER PUBLICATIONS

International Search Report issued Jul. 22, 2008 in International (PCT) Application No. PCT/JP2008/001632.

*Primary Examiner*—Khoi Tran
*Assistant Examiner*—Jonathan Sample
(74) *Attorney, Agent, or Firm*—Wenderoth, Lind & Ponack, L.L.P.

(57) ABSTRACT

A control device for a robot arm is designed such that, based on information on a transportation state database in which information on a transportation state of a person operating the arm is recorded, an impedance setting unit sets a mechanical impedance set value of the arm, and an impedance control unit controls a mechanical impedance value of the arm to the mechanical impedance set value thus set.

7 Claims, 20 Drawing Sheets

U.S. PATENT DOCUMENTS

| | | | |
|---|---|---|---|
| 7,558,647 B2 * | 7/2009 | Okazaki | 700/260 |
| 2003/0135303 A1 * | 7/2003 | Arai et al. | 700/245 |
| 2004/0028260 A1 * | 2/2004 | Higaki et al. | 382/118 |
| 2004/0140787 A1 * | 7/2004 | Okamoto et al. | 318/568.21 |
| 2004/0211883 A1 * | 10/2004 | Imagawa et al. | 250/208.1 |
| 2005/0055132 A1 * | 3/2005 | Matsumoto et al. | 700/245 |
| 2007/0150105 A1 * | 6/2007 | Orita et al. | 700/245 |
| 2008/0161970 A1 * | 7/2008 | Adachi et al. | 700/253 |

FOREIGN PATENT DOCUMENTS

| | | |
|---|---|---|
| JP | 10-192350 | 7/1998 |
| JP | 10-329071 | 12/1998 |
| JP | 2000-84881 | 3/2000 |
| JP | 2000-202790 | 7/2000 |
| JP | 2001-113481 | 4/2001 |
| JP | 2004-148466 | 5/2004 |
| JP | 2007-75974 | 3/2007 |

* cited by examiner

*Fig.8*

| ID | PHYSICAL CHARACTERISTICS | | | | ATTRIBUTE | | NAME |
|---|---|---|---|---|---|---|---|
| | WEIGHT | DIMENSION | HARDNESS | TEMPERATURE (°C) | DEGREE OF SHARPNESS | DEGREE OF IMPORTANCE | |
| 0001 | 0.5 | 0.3 | 5 | 30 | 5 | 2 | KITCHEN KNIFE |
| 0002 | 0.8 | 0.45 | 5 | 100 | 2 | 1 | PAN |
| 0003 | 0.1 | 0.2 | 4 | 20 | 3 | 3 | GLASS TUMBLER |
| 0004 | 0.03 | 0.2 | 1 | 10 | 1 | 1 | TOWEL |
| 0005 | 3.00 | 0.4 | 2 | 10 | 2 | 2 | RICE |
| 0006 | 0.5 | 1.5 | 3 | 10 | 4 | 3 | CHOPSTICKS |
| ... | ... | ... | ... | | ... | | ... |
| 0002 | 1.5 | 0.45 | 4 | 10 | 2 | 1 | PAN |

8a — rows 0001–...
8b — row 0002

Fig. 9

| | | | | | | |
|---|---|---|---|---|---|---|
| BODY CONDITION INFORMATION | BLOOD PRESSURE | 100/75 | 95/70 | 100/80 | ... | 97/60 |
| | BODY TEMPERATURE | 36.0 | 36.1 | 35.8 | ... | 36.2 |
| | HEART RATE | 80 | 82 | 70 | ... | 80 |
| | DEGREE OF VIBRATION | 3 | 1 | 2 | ... | 1 |
| POSTURE INFORMATION | HOLDING HAND | 1 | 2 | 2 | ... | 1 |
| | CENTER-OF-GRAVITY COORDINATES | (0.5, 0.7) | (0.5, 0.7) | (0.6, 0.8) | ... | (0.8, 0.2) |
| | ELBOW JOINT ANGLE | 150 | 90 | 75 | ... | 60 |
| | LENGTH BETWEEN LEGS | 0.3 | 0.2 | 0.5 | ... | 0.2 |
| | STERNUM UPPER EDGE HEIGHT | 1.2 | 1.2 | 1.3 | ... | 1.2 |
| | SHOULDER POSITION | (1.0, 0.3, 1.2) | (1.1, 0.4, 1.1) | (1.1, 0.4, 1.1) | ... | (1.2, 0.4, 1.1) |
| | ELBOW POSITION | (1.0, 0.3, 0.8) | (1.1, 0.4, 0.6) | (1.0, 0.3, 1.0) | ... | (1.2, 0.4, 1.0) |
| | HAND POSITION | (1.0, 0.3, 1.0) | (1.1, 0.4, 0.9) | (1.0, 0.3, 1.2) | ... | (1.2, 0.4, 1.1) |
| BODY CHARACTERISTIC INFORMATION | DOMINANT HAND | 1 | 1 | 2 | ... | 1 |
| | WEIGHT | 48 | 48 | 70 | ... | 48 |
| | HEIGHT | 1.6 | 1.6 | 1.8 | ... | 1.6 |
| | NAME | HANAKO MATSUSHITA | HANAKO MATSUSHITA | TARO MATSUSHITA | ... | HANAKO MATSUSHITA |
| | SEX | 2 | 2 | 1 | ... | 2 |
| | AGE | 28 | 28 | 35 | ... | 28 |
| | MEASURING TIME AND DATE | 2006/2/15 8:00 | 2006/2/16 8:00 | 2006/2/17 12:00 | ... | 2006/2/16 8:20 |
| | ID | 1 | 1 | 3 | ... | 1 |

9a                                          9b

| MAINTAIN POSITION | MAINTAIN POSTURE | MAINTAIN HEIGHT |
|---|---|---|
| 0 | 1 | 0 |
| 1 | 1 | 0 |
| 0 | 1 | 1 |

| AGE | THRESHOLD VALUE OF FREQUENCY |
|---|---|
| 0—19 | 2 |
| 20—39 | 4 |
| 40—54 | 3 |
| 55—69 | 2 |
| 70— | 1 |

Fig. 18

| DIFFERENCE FROM THRESHOLD VALUE (VALUE - THRESHOLD VALUE) | STAGE |
|---|---|
| 0—1 | 1 |
| 2—4 | 2 |
| 5—7 | 3 |
| 8—10 | 4 |
| 15— | 5 |

Fig. 19A

| LEVEL | ELBOW JOINT ANGLE (DEGREE) | DIFFERENCE BETWEEN STERNUM UPPER EDGE HEIGHT AND HAND POSITION (HAND POSITION - STERNUM UPPER EDGE HEIGHT) (m) | DISTANCE FROM SUPPORTING BASE FACE (m) |
|---|---|---|---|
| 1 | 0—100 | -0.2 or less | 0 or less |
| 2 | 101—114 | -0.19~-0.09 | 0.1~0.4 |
| 3 | 115—129 | -0.1~0 | 0.5~0.6 |
| 4 | 130—159 | 0.01~0.09 | 0.7~0.9 |
| 5 | 160 or more | 0.1 or more | 1 or more |

Fig.19B

| LEVEL | A7 DEGREE OF VIBRATION | A8 HEART RATE | A9 BODY TEMPERATURE (°C) | A10 BLOOD PRESSURE (mmHg) | | |
|---|---|---|---|---|---|---|
| | | | | 65 YEARS OLD OR ELDER | YOUNGER THAN 65 YEARS OLD | DIABETIC, KIDNEY DISEASE PATIENT |
| 1 | 1 | 70 or less | 37.5 or less | 140/90 or less | 130/85 or less | 130/85 or less |
| 2 | 2 | 71~79 | 37.6~37.9 | 141/91~149/94 | 131/86~144/89 | 131/81~144/89 |
| 3 | 3 | 80~89 | 38.0~38.9 | 150/95~164/99 | 145/90~164/99 | 145/90~164/99 |
| 4 | 4 | 90~119 | 39.0~39.9 | 165/100~179/109 | 165/100~179/109 | 165/100~179/109 |
| 5 | 5 | 120 or more | 40 or more | 180/110 or more | 180/110 or more | 180/110 or more |

Fig.21A

| LEVEL | ELBOW JOINT ANGLE (DEGREE) | DIFFERENCE BETWEEN STERNUM UPPER EDGE HEIGHT AND HAND POSITION (HAND POSITION−STERNUM UPPER EDGE HEIGHT) (m) | DISTANCE FROM SUPPORTING BASE FACE (m) |
|---|---|---|---|
| 1 | 0−100 | −0.2 or less | 0 or less |
| 1 | 101−114 | −0.19~−0.09 | 0.1~0.4 |
| 1 | 115−129 | −0.1~0 | 0.5~0.6 |
| 2 | 130−159 | 0.01~0.09 | 0.7~0.9 |
| 3 | 160 or more | 0.1 or more | 1 or more |

Fig.21B

| LEVEL | ELBOW JOINT ANGLE (DEGREE) | DIFFERENCE BETWEEN STERNUM UPPER EDGE HEIGHT AND HAND POSITION (HAND POSITION−STERNUM UPPER EDGE HEIGHT) (m) | DISTANCE FROM SUPPORTING BASE FACE (m) |
|---|---|---|---|
| 3 | 0–100 | −0.2 or less | 0 or less |
| 3 | 101–114 | −0.19~−0.09 | 0.1~0.4 |
| 4 | 115–129 | −0.1~0 | 0.5~0.6 |
| 5 | 130–159 | 0.01~0.09 | 0.7~0.9 |
| 5 | 160 or more | 0.1 or more | 1 or more |

Fig.22

| ID | TEMPERATURE (°C) | DEGREE OF DANGER |
|---|---|---|
| 0101 | 100 | 5 |
| 0102 | 80 | 4 |
| 0103 | 60 | 3 |
| 0104 | 50 | 3 |
| 0105 | 30 | 2 |
| 0106 | 20 | 1 |
| ... | ... | ... |
| 0110 | 10 | 1 |

APPARATUS AND METHOD FOR CONTROLLING ROBOT ARM, AND ROBOT AND PROGRAM

TECHNICAL FIELD

The present invention relates to a control device and a control method for a robot arm to be used when a person and a robot carry out a job (such as an object transporting job) in cooperation with each other, a robot having such a control device for a robot arm, as well as a control program and an integrated electronic circuit for a robot arm.

BACKGROUND ART

In recent years, house-service robots, such as a nursing robot and a house-keeping assist robot, have been vigorously developed. Since the house-service robot carries out jobs around a person unlike industrial robots, it is inevitable for the robot to come into contact with a person, and the robot needs to have a flexible structure from the viewpoint of safety and also needs to be flexible in its movements.

As one example of the robot device, a technique for ensuring control device operation precision has been proposed in which a contact force with a person, applied to a robot arm, is detected and, upon application of a great force to the arm, a restoring force is made smaller to ensure safety, while upon application of a small force to the arm, the restoring force is made greater to maintain the operation precision (see Patent Document 1).

Moreover, in a control device of an arm or leg control device that controls operations of the device by carrying out a force control or a positional control based on sensing information on a force sensor or a position/angle sensor attached to the device in an attempt to move an arm or a leg with the help of the device attached to the arm or leg, a technique has been proposed in which the load imposed to the arm or leg attached to the device is always monitored during operations of the driving device, and when the load onto the arm or leg has reached a value Fstart that is set to a value smaller than a preset excessive load value Flimit to the arm or leg, among all the degrees of freedom possessed by the operations of the driving device, an impedance constant in a direction of a certain degree of freedom is changed as the load value onto the arm or leg comes closer to the excessive load value Flimit so that the operation in the corresponding direction of the degree of freedom is made hypothetically free (see Patent Document 2).

Moreover, a technique has also been proposed in which, based on an inputted parameter of the arm or leg, a typical movement pattern is generated, and a target track of the limb driving device is calculated, and by using only the information on the parameter of the arm or leg, the limb driving device is switched to carry out either one of operations of a driven movement, a self-driving movement and a resistance movement (see Patent Document 3).

Patent Document 1: Japanese Unexamined Patent Publication No. 10-329071

Patent Document 2: Japanese Unexamined Patent Publication No. 9-154900

Patent Document 3: Japanese Unexamined Patent Publication No. 10-192350

DISCLOSURE OF INVENTION

Subject to be Solved by the Invention

However, the conventional technique shown in Patent Document 1 is designed so that, upon application of a great force to the robot arm, the restoring force is made smaller, that shown in Patent Document 2 is designed so that, when the load onto the arm or leg becomes greater, an unnecessary load is prevented from being applied, and that shown in Patent Document 3 is designed so that switching is made to either one of operations of a driven movement, a self-driving movement and a resistance movement in accordance with the movement of the arm or leg; therefore, problems arise in which, since due to a bad posture of a person operating the device, the force of the operating person becomes insufficient to cause a misoperation due to a trembling hand, or a transporting object grabbed by the robot arm is tilted to cause a falling down of the contents thereof, or, in a case where the transporting object is a hard object or an object having a sharp edge, the moving transporting object tends to cause a burden on the person.

The present invention has been devised to solve the above-mentioned problems, and the object of the present invention is to provide a control device and a control method for a robot arm which achieve safe robot controlling operations so that, even when the posture or body condition of the person who carries out an object transporting job in cooperation with the robot arm is bad, the robot arm is prevented from being tilted to cause a falling down of the transporting object, and a robot, a robot arm control program and an integrated electronic circuit used for such a robot arm.

Means for Solving the Subject

In order to achieve the above-mentioned object, the present invention has the following structures.

According to a first aspect of the present invention, there is provided a control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means; and a rigidity control means for controlling rigidity of the robot arm so as to be increased as the degree of danger calculated by the degree-of-danger calculating means becomes greater.

According to an 18th aspect of the present invention, there is provided a control device for a robot arm, the device comprising:

a positional information acquiring means for acquiring positional information on the robot arm and positional information on a person cooperating with the robot arm;

degree-of-danger calculating unit that calculates a relative position between the positional information on the robot arm and the positional information on the person, and calculates a degree of danger in accordance with the calculated relative position; and a rigidity control means for controlling rigidity of the robot arm so as to be increased as the degree of danger calculated by the degree-of-danger calculating unit becomes greater.

According to a 24th aspect of the present invention, there is provided a control method for a robot arm, the method comprising of:

allowing a degree-of-danger calculating means to calculate a degree of danger caused when a person transports an object, based on working posture information on a working posture of the person cooperating with the robot arm when the person and the robot arm cooperatively transport the object; and allowing a rigidity control means to control the robot arm so as to have higher rigidity as the degree of danger calculated by the degree-of-danger calculating means becomes greater.

According to a 26th aspect of the present invention, there is provided a control program for a robot arm to be executed by a computer, the program comprising:

a degree-of-danger calculating step of calculating a degree of danger caused when a person transports an object, based on working posture information on a working posture of the person cooperating with the robot arm when the person and the robot arm cooperatively transport the object; and a rigidity control means for controlling the robot arm so as to have higher rigidity as the degree of danger calculated by the degree-of-danger calculating step becomes greater.

According to a 27th aspect of the present invention, there is provided an integrated electronic circuit for controlling a robot arm, the circuit comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information; and a rigidity control means for controlling rigidity of the robot arm so as to be increased as the degree of danger calculated by the degree-of-danger calculating means becomes greater.

According to a 28th aspect of the present invention, there is provided a control method for a robot arm, the method comprising of:

allowing a degree-of-danger calculating unit to calculate, as a cooperative transportation information, a relative position between positional information on the robot arm and positional information on the person cooperating with the robot arm, and allowing the degree-of-danger calculating unit to calculate a degree of danger in accordance with the calculated relative position; and allowing a rigidity control means to control the robot arm so as to have higher rigidity as the calculated degree of danger becomes greater.

According to a 30th aspect of the present invention, there is provided a control program for a robot arm to be executed by a computer, comprising:

a positional information acquiring step of acquiring positional information on the robot arm and positional information on a person cooperating with the robot arm when the person and the robot arm transport an object in cooperation with each other;

a degree-of-danger calculating step of calculating a relative position between the positional information on the robot arm and the positional information on the person cooperating with the robot arm, and calculating a degree of danger in accordance with the calculated relative position; and the step of controlling the robot arm so as to have higher rigidity as the degree of danger calculated by the degree-of-danger calculating means becomes greater.

According to a 31st aspect of the present invention, there is provided an integrated electronic circuit for controlling a robot arm, the circuit comprising:

a positional information acquiring means for acquiring positional information on the robot arm and positional information on a person cooperating with the robot arm;

a degree-of-danger calculating means for calculating a relative position between the positional information on the robot arm and the positional information on the person cooperating with the robot arm, and calculating a degree of danger in accordance with the calculated relative position; and a rigidity controlling means for controlling the robot arm so as to have higher rigidity as the degree of danger calculated by the degree-of-danger calculating means becomes greater.

Effects of the Invention

As described above, in accordance with the control device for a robot arm and the robot of the present invention, since at least the degree-of-danger calculating means and the rigidity control means are provided (moreover, for example, the impedance setting means and the impedance control means are provided), the robot arm is controlled so as to increase its rigidity in accordance with working posture information (moreover, for example, body condition information or cooperative transporting information, such as relative position between the robot arm and the person) of a person cooperating with the robot arm (for example, the mechanical impedance set value of the robot arm is appropriately set), so that it is possible to provide safe robot controlling operations that can prevent a misoperation due to a bad posture of a person operating the device, or due to an insufficient force of the operating person and a subsequent trembling hand, or a tilted object being transported by the robot arm and the subsequent falling down of the contents thereof, or a burden imposed on the person by a moving transporting object in a case where the transporting object is a hard object or an object having a sharp edge.

Moreover, in accordance with the control device and control program for a robot arm of the present invention, since, based on working posture information on the working posture of a person cooperating with the robot arm, a controlling operation is properly carried out to increase the rigidity of the robot arm (for example, the mechanical impedance set value of the robot arm is appropriately set and controlled), it is possible to provide safe robot controlling operations that can prevent a misoperation due to a bad posture of a person operating the device, or due to an insufficient force of the operating person and a subsequent trembling hand, or a tilted object being transported by the robot arm and the subsequent falling down of the contents thereof, or a burden imposed on the person by a moving transporting object in a case where the transporting object is a hard object or an object having a sharp edge.

BRIEF DESCRIPTION OF DRAWINGS

These and other aspects and features of the present invention will become clear from the following description taken in conjunction with the preferred embodiments thereof with reference to the accompanying drawings, in which:

FIG. 8 is a table describing a list of object characteristics of a transportation state database in accordance with the first embodiment of the present invention;

FIG. 9 is a table describing a list of working states of the transportation state database in accordance with the first embodiment of the present invention;

FIG. 18 is a table showing stages of the frequency in the body-condition measuring unit in accordance with the first embodiment of the present invention;

FIG. 19A is a table showing a specific example of a determination database in accordance with the first embodiment of the present invention;

FIG. 19B is a table showing another specific example of the determination database in accordance with the first embodiment of the present invention;

FIG. 21A is a table showing an example, in a table format, to be used for calculating the degree of danger so as to be a low level in a case where the weight of an object is light, in accordance with the first embodiment of the present invention;

FIG. 21B is a table showing an example, in a table format, to be used for calculating the degree of danger so as to be a high level in a case where the weight of an object is heavy; and FIG. 22 is a table showing a relationship between the temperature and the degree of danger in accordance with a modified example of the present invention.

BEST MODE FOR CARRYING OUT THE INVENTION

Figure 1:
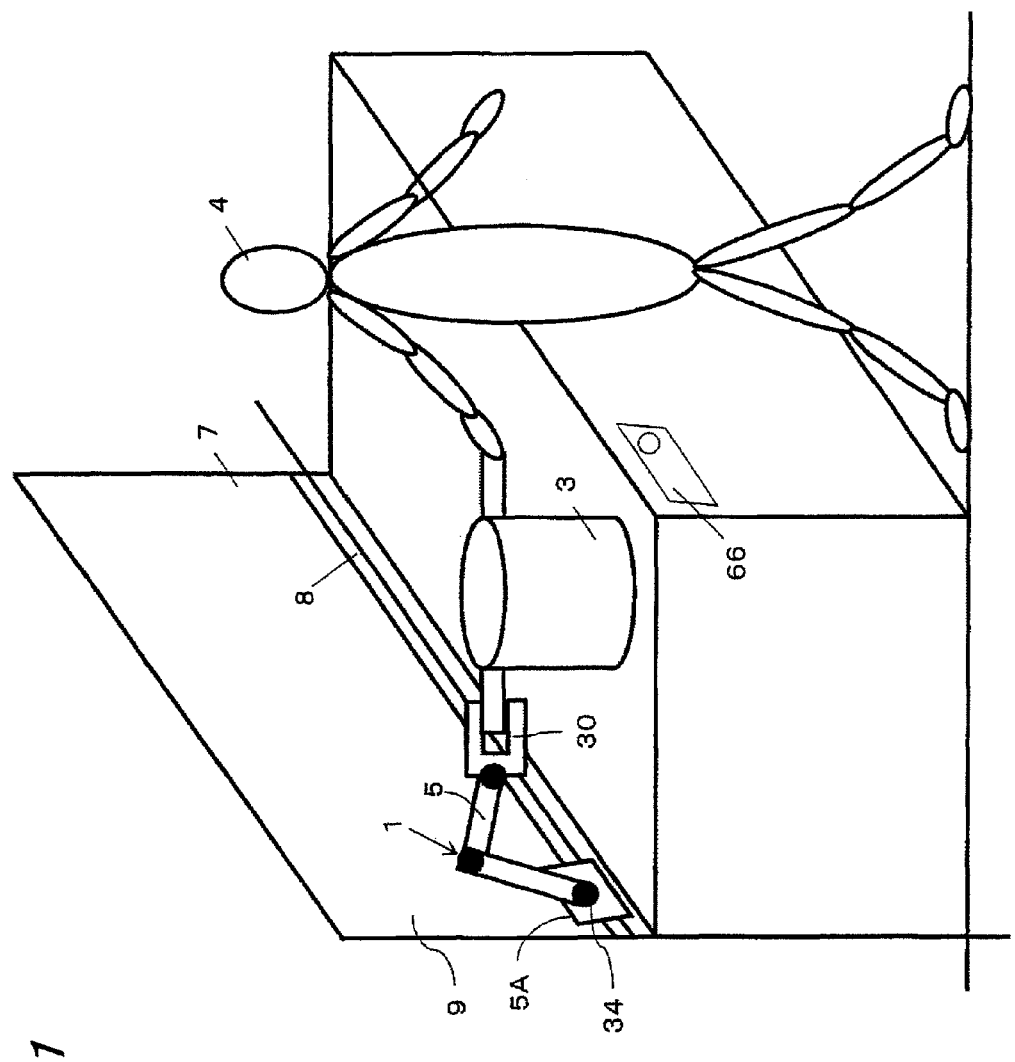
FIG. 1 is a schematic view showing a structure of a robot control device in accordance with a first embodiment of the present invention.

Referring to the drawings, the following description will discuss in detail embodiments of the present invention.

Prior to the detailed description of the embodiments of the present invention with reference to the drawings, the following description will discuss various aspects of the present invention.

According to a first aspect of the present invention, there is provided a control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means; and a rigidity control means for controlling rigidity of the robot arm so as to be increased as the degree of danger calculated by the degree-of-danger calculating means becomes greater.

According to a second aspect of the present invention, there is provided the control device for a robot arm according to the first aspect, further comprising:

an impedance setting means for setting a mechanical impedance set value of the robot arm to a greater value as the degree of danger calculated by the degree-of-danger calculating means becomes greater, wherein the rigidity control means controls the mechanical impedance value of the robot arm to the mechanical impedance set value set by the impedance setting means.

With this arrangement, based on working posture information on a working posture of a person upon transporting the object, the information serving as one example of cooperative transporting information, the mechanical impedance set value is set so as to carry out controlling operations.

According to a third aspect of the present invention, there is provided the control device for a robot arm according to the second aspect, wherein the impedance setting means individually sets mechanical impedance set values in six dimensional directions including translation directions and a rotating direction of a hand position of the robot arm, based on the degree of danger upon transporting the object.

With this arrangement, the mechanical impedance set values are set respectively in six dimensional directions based on the working posture of the person upon transporting the object so as to carry out controlling operations.

According to a fourth aspect of the present invention, there is provided the control device for a robot arm according to the third aspect, wherein the impedance setting means respectively sets the mechanical impedance set values such that, by making a rigidity in the rotation direction higher than a rigidity in the translation direction of the hand position based on the degree of danger upon transporting the object, the object being transported by the robot arm is horizontally maintained.

With this arrangement, the object being transported by the robot arm can be maintained horizontally by the working posture of the person transporting the object, so as to carry out controlling operations.

According to a fifth aspect of the present invention, there is provided the control device for a robot arm according to the first aspect, wherein the working posture information includes a piece of information on an elbow joint angle on a side where the person is cooperating with the robot arm, and the degree-of-danger calculating means calculates the degree of danger so as to be a greater value as the elbow joint angle upon transporting the object becomes greater, while the degree-of-danger calculating means calculates the degree of danger so as to be a smaller value as the elbow joint angle upon transporting the object becomes smaller.

With this arrangement, the mechanical impedance set value can be set in accordance with the elbow joint angle of the person upon working, and the degree of danger can be calculated to a greater value as the elbow joint angle of the person upon working becomes larger.

According to a sixth aspect of the present invention, there is provided the control device for robot arm according to the first aspect, wherein the working posture information includes a piece of information on a hand position on a side where the person is cooperating with the robot arm, and a piece of information on a sternum upper edge height corresponding to a height from a sternum of the person to a floor surface, and the degree-of-danger calculating means calculates the degree of danger so as to be a greater value as the height of the hand position becomes higher than the sternum upper edge height, while the degree-of-danger calculating means calculates the degree of danger so as to be a smaller value as the height of the hand position becomes lower than the sternum upper edge height.

With this arrangement, the degree of danger can be calculated to a greater value as the height of the hand position of the person operating the robot arm becomes higher than the sternum upper edge height.

According to a seventh aspect of the present invention, there is provided the control device for a robot arm according to the first aspect, wherein the working posture information includes a piece of information on center-of-gravity coordinates of the person cooperating with the robot arm, and a piece of information on a supporting base bottom face serving as a supporting face of the person on a floor surface, and the degree-of-danger calculating means determines whether or not the center-of-gravity coordinates of the person are located within a range of the supporting base bottom face of the person, and in a case where the center-of-gravity coordinates are located out of the range, the degree-of-danger calculating means calculates the degree of danger so as to be a greater value as a distance from the center-of-gravity coordinates of the person to the supporting base bottom face becomes larger.

With this arrangement, it is determined whether or not the center-of-gravity coordinates of the person are located within the range of the supporting base face of the person, and in a case where they are out of the range, the degree of danger is calculated to a greater value as the distance from the supporting base face becomes longer.

According to an eighth aspect of the present invention, there is provided the control device for a robot arm according to the first aspect, wherein the working posture information includes a piece of information on a dominant hand of the person cooperating with the robot arm, and the degree-of-danger calculating means determines whether or not the person is operating the robot arm with the dominant hand, and in a case where the person is operating with the dominant hand, the degree-of-danger calculating means calculates the degree of danger so as to be a value smaller than the value in a case where the person is operating without using the dominant hand.

With this arrangement, it is determined whether or not the person is operating the robot arm with the dominant hand, and in a case where the person is operating without using the dominant hand, the degree of danger can be calculated to a greater value by the degree-of-danger calculating means.

According to a ninth aspect of the present invention, there is provided the control device for a robot arm according to the first aspect, further comprising:

a body condition information acquiring means for acquiring body condition information on body conditions of the person cooperating with the robot arm when the person and the robot arm transport the object in cooperation with each other, and the degree-of-danger calculating means calculates the degree of danger of the person upon transporting the object based on the working posture information and the body condition information.

With this arrangement, the degree-of-danger can be calculated based on the body condition information on the person upon transporting the object.

According to a 10th aspect of the present invention, there is provided the control device for a robot arm according to the ninth aspect, wherein the degree-of-danger calculating means determines whether or not the body condition information is located within a range of normal body condition information, and in a case where the body condition information is out of the range of the normal body condition information, the degree-of-danger calculating means calculates the degree of danger so as to be a greater value as a difference between the body condition information and the range of the normal body condition information becomes greater.

With this arrangement, it is determined whether or not the body condition information is within a normal body condition information range, and in a case where it is out of the range, the degree of danger can be calculated to a greater value as the difference from the normal body condition information range becomes larger.

According to an 11th aspect of the present invention, there is provided the control device for a robot arm according to the ninth aspect, wherein the body condition information includes at least one of pieces of information on a degree of vibration of a hand of an arm of the person on a side where the person is cooperating with the robot arm, information on a heart rate of the person cooperating with the robot arm, information on a blood pressure of the person cooperating with the robot arm, and a body temperature of the person cooperating with the robot arm.

With this arrangement, the degree of danger can be calculated based on the information on the degree of vibration, the information on the heart rate, the information on the blood pressure and the information on the body temperature.

According to a 12th aspect of the present invention, there is provided the control device for a robot arm according to the first or ninth aspect, wherein the working posture information acquiring means acquires object characteristic information on object characteristics of the object being transported by the robot arm, and the impedance setting means sets the mechanical impedance set value of the robot arm based on the degree of danger upon transporting the object and the object characteristic information.

With this arrangement, based on the working posture information acquired by the working posture information acquiring means and the information on the physical characteristic of the object being transported by the robot arm, the rigidity of the robot arm can be controlled (for example, controlled by determining the mechanical impedance set value).

According to a 13th aspect of the present invention, there is provided the control device for a robot arm according to the 12th aspect, wherein the impedance setting means individually sets mechanical impedance set values in six dimensional directions including translation directions and a rotating direction of a hand position of the robot arm, based on the degree of danger and the object characteristic information.

With this arrangement, based on the degree of danger and the object characteristic information, the mechanical impedance set value can be set so as to carry out controlling operations.

According to a 14th aspect of the present invention, there is provided the control device for a robot arm according to the 12th aspect, wherein the impedance setting means respectively sets the mechanical impedance set values such that, by making a rigidity in the rotation direction higher than a rigidity in the translation direction of the hand position of the robot arm based on the degree of danger and the object characteristic information, the object being transported by the robot arm is horizontally maintained.

With this arrangement, the object being transported by the robot arm can be maintained horizontally.

According to a 15th aspect of the present invention, there is provided the control device for a robot arm according to the 12th aspect, wherein the degree-of-danger calculating means calculates the degree of danger so as to be a greater value in a case where the object characteristic information is greater than a threshold value, and calculates the degree of danger so as to be a small value in a case where the object characteristic information is smaller than the threshold value.

With this arrangement, in a case where the object characteristic information is greater than the threshold value, the degree-of-danger calculating means can set the degree of danger to a greater value, and in a case where the object characteristic information is smaller than the threshold value, it can set the degree of danger to a smaller value.

According to a 16th aspect of the present invention, there is provided the control device for a robot arm according to the 12th aspect, wherein the object characteristic information includes at least one of pieces of physical characteristic information on the object being transported by the robot arm and attribute information on the object, and the impedance setting means sets the mechanical impedance set value of the robot arm based on the degree of danger calculated by the degree-of-danger calculating means and at least one of pieces of the physical characteristic information and the attribute information.

With this arrangement, the impedance setting means can carry out calculating processes based on the degree of danger calculated by the degree-of-danger calculating means and at least one of the physical characteristic information and the object attribute information.

According to a 17th aspect of the present invention, there is provided the control device for a robot arm according to the 12th aspect, wherein the physical characteristic information on the object being transported by the robot arm includes at least one of pieces of weight information on the object being transported by the robot arm, dimension information on the object, hardness information on the object, and position and posture constraint condition information on the object, and the attribute information on the object includes at least one of pieces of degree of sharpness information on the object being transported by the robot arm and degree of importance information on the object being transported by the robot arm.

With this arrangement, the impedance setting means can carry out calculating processes based on the degree of danger calculated by the degree-of-danger calculating means and one of the weight information, the dimension information, the hardness information on the object, the position and posture constraint condition information on the object, the sharpness information, and the degree-of-importance information.

According to an 18th aspect of the present invention, there is provided a control device for a robot arm, the device comprising:

a positional information acquiring means for acquiring positional information on the robot arm and positional information on a person cooperating with the robot arm;

a degree-of-danger calculating unit that calculates a relative position between the positional information on the robot arm and the positional information on the person, and calculates a degree of danger in accordance with the calculated relative position; and a rigidity control means for controlling rigidity of the robot arm so as to be increased as the degree of danger calculated by the degree-of-danger calculating unit becomes greater.

With this arrangement, based on the relative position, controlling processes can be carried out to increase the rigidity of the robot arm (for example, by determining the mechanical impedance set value of the robot arm).

According to a 19th aspect of the present invention, there is provided the control device for a robot arm according to the 18th aspect, further comprising:

an impedance setting means for setting a mechanical impedance set value of the robot arm based on the degree of danger calculated by the degree-of-danger calculating unit, wherein the rigidity control means controls a mechanical impedance value of the robot arm to the mechanical impedance set value set by the impedance setting means.

With this arrangement, the mechanical impedance set value of the robot arm can be set, and controlling processes can be carried out to increase the rigidity of the robot arm based on the relative position. That is, the robot arm can be controlled in accordance with a change in the relative position derived from the positional information on the robot arm and the positional information on the person cooperating with the robot arm. Consequently, it becomes possible to properly reset the mechanical impedance set value of the robot arm in accordance with the change in the relative position, and consequently to control the robot more safely even in a case where a misoperation tends to occur due to a bad posture of an operating person or due to an insufficient force of the operating person and a subsequent trembling hand, or in a case where the object being transported by the robot arm starts to tilt and tends to cause the subsequent falling down of the contents thereof.

According to a 20th aspect of the present invention, there is provided the control device for a robot arm according to the 19th aspect, wherein the degree-of-danger calculating unit calculates the degree of danger so as to be a greater value as the calculated relative position becomes closer, while the degree-of-danger calculating means calculates the degree of danger so as to be a smaller value as the calculated relative position becomes farther from each other, and the impedance setting means sets the mechanical impedance set value of the robot arm to a greater value as the degree of danger calculated by the degree-of-danger calculating unit becomes greater, while the impedance setting means sets the mechanical impedance set value of the robot arm to a smaller value as the degree of danger becomes smaller.

According to a 21st aspect of the present invention, there is provided the control device for a robot arm according to the 19th aspect, wherein the impedance setting means individually sets mechanical impedance set values in six dimensional directions including translation directions and a rotating direction of a hand position of the robot arm, based on the degree of danger calculated by the degree-of-danger calculating unit.

With this arrangement, the impedance setting means is capable of individually setting, based on the relative position, mechanical impedance set values in six dimensional directions including translation directions of the hand position of the robot arm and a rotating direction thereof.

According to a 22nd aspect of the present invention, there is provided the control device for a robot arm according to the 19th aspect, wherein, in a case where the relative position is small and the degree of danger calculated by the degree-of-danger calculating unit is high, the impedance setting means allows an impedance control means to control the mechanical impedance value of the robot arm to a value lower than the mechanical impedance set value in each of the translation directions and the rotation direction of the hand position set by the impedance setting means, while in a case where the relative position is larger and the degree of danger calculated by the degree-of-danger calculating unit is low, the impedance setting means allows the impedance control means to control the mechanical impedance value of the robot arm to the mechanical impedance set value set by the impedance setting means.

With this arrangement, in a case where the distance between the relative position is small to cause a high degree of danger, the rigidity in each of the translation directions of the hand position and the rotating direction thereof is made lower, and in a case where the distance between the relative position is large to cause a low degree of danger, the rigidity in each of the translation directions of the hand position and the rotating direction thereof is made higher.

According to a 23rd aspect of the present invention, there is provided the control device for robot arm according to the first or 18th aspect, further comprising:

an informing means for informing the person cooperating with the robot arm of the degree of danger.

With this arrangement, the operator can be informed of the degree of danger.

According to a 24th aspect of the present invention, there is provided a control method for a robot arm, the method comprising of:

allowing a degree-of-danger calculating means to calculate a degree of danger caused when a person transports an object, based on working posture information on a working posture of the person cooperating with the robot arm when the person and the robot arm cooperatively transport the object; and allowing a rigidity control means to control the robot arm so as to have higher rigidity as the degree of danger calculated by the degree-of-danger calculating means becomes greater.

According to a 25th aspect of the present invention, there is provided a robot comprising a robot arm, and the control device for controlling the robot arm according to any one of the first to 17th aspects.

According to a 26th aspect of the present invention, there is provided a control program for a robot arm to be executed by a computer, the program comprising:

a degree-of-danger calculating step of calculating a degree of danger caused when a person transports an object, based on working posture information on a working posture of the person cooperating with the robot arm when the person and the robot arm cooperatively transport the object; and a rigidity control means for controlling the robot arm so as to have higher rigidity as the degree of danger calculated by the degree-of-danger calculating step becomes greater.

According to a 27th aspect of the present invention, there is provided an integrated electronic circuit for controlling a robot arm, the circuit comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information; and a rigidity control means for controlling rigidity of the robot arm so as to be increased as the degree of danger calculated by the degree-of-danger calculating means becomes greater.

According to a 28th aspect of the present invention, there is provided a control method for a robot arm, the method comprising of:

allowing a degree-of-danger calculating unit to calculate, as a cooperative transportation information, a relative position between positional information on the robot arm and positional information on the person cooperating with the robot arm, and allowing the degree-of-danger calculating unit to calculate a degree of danger in accordance with the calculated relative position; and allowing a rigidity control means to control the robot arm so as to have higher rigidity as the calculated degree of danger becomes greater.

According to a 29th aspect of the present invention, there is provided a robot comprising a robot arm, and the control device for controlling the robot arm according to any one of the 18th to 22nd aspects.

According to a 30th aspect of the present invention, there is provided a control program for a robot arm to be executed by a computer, comprising:

a positional information acquiring step of acquiring positional information on the robot arm and positional information on a person cooperating with the robot arm when the person and the robot arm transport an object in cooperation with each other;

a degree-of-danger calculating step of calculating a relative position between the positional information on the robot arm and the positional information on the person cooperating with the robot arm, and calculating a degree of danger in accordance with the calculated relative position; and the step of controlling the robot arm so as to have higher rigidity as the degree of danger calculated by the degree-of-danger calculating means becomes greater.

According to a 31st aspect of the present invention, there is provided an integrated electronic circuit for controlling a robot arm, the circuit comprising:

a positional information acquiring means for acquiring positional information on the robot arm and positional information on a person cooperating with the robot arm;

a degree-of-danger calculating means for calculating a relative position between the positional information on the robot arm and the positional information on the person cooperating with the robot arm, and calculating a degree of danger in accordance with the calculated relative position; and a rigidity controlling means for controlling the robot arm so as to have higher rigidity as the degree of danger calculated by the degree-of-danger calculating means becomes greater.

Referring to the drawings, the following description will discuss embodiments in detail in accordance with the present invention.

First Embodiment

The following description will discuss the structure of a robot system 1 provided with a robot arm control device in accordance with a first embodiment of the present invention. FIG. 1 is a schematic view showing a structure of the robot system 1 in the first embodiment of the present invention.

As shown in FIG. 1, a robot arm 5 of a robot system 1 provided with the robot arm 5 and its control device 2 in accordance with the first embodiment of the present invention is attached to a wall face 9 of a work base 7 such as a kitchen or a table, with the base end of the robot arm 5 being movably supported on a rail 8 that is secured to the wall face 9, so that the robot arm 5 is allowed to move on the rail 8 in a lateral direction, for example, in a horizontal direction, along the rail 8. Moreover, a hand 30 on the tip of the robot arm 5 of the robot system 1 is allowed to hold, for example, to grab, one end of an object 3 to be transported, with the other end being grabbed by a person 4 who works in cooperation with the robot arm 5. In the state where the tip of the robot arm 5 grabs one end of the object 3 (such as one of handles of a pan) while the person 4 grabs the other end of the object 3 (such as the other handle of the pan), the person applies a force to the object 3 in a direction in which the object is desirably transported, and the robot system 1 is thus actuated so that the robot arm 5 is shifted along the rail 8 to transport the object 3, with the robot arm 5 and the person 4 working in cooperation with each other.

In the first embodiment of the present invention, the object 3 forms a concept including a pan or an eating utensil containing water or cooking materials, or a heavy object such as a piece of furniture, that is, an object that can be transported by the robot arm 5 and the person 4 in cooperation with each other.

Moreover, the rail 8 is placed on the wall face 9 of the work base 7 in the first embodiment of the present invention; however, in the case of an island kitchen without wall faces, it may be installed at a place suitable for working, such as a ceiling face or a working side face of the island kitchen.

Figure 2:
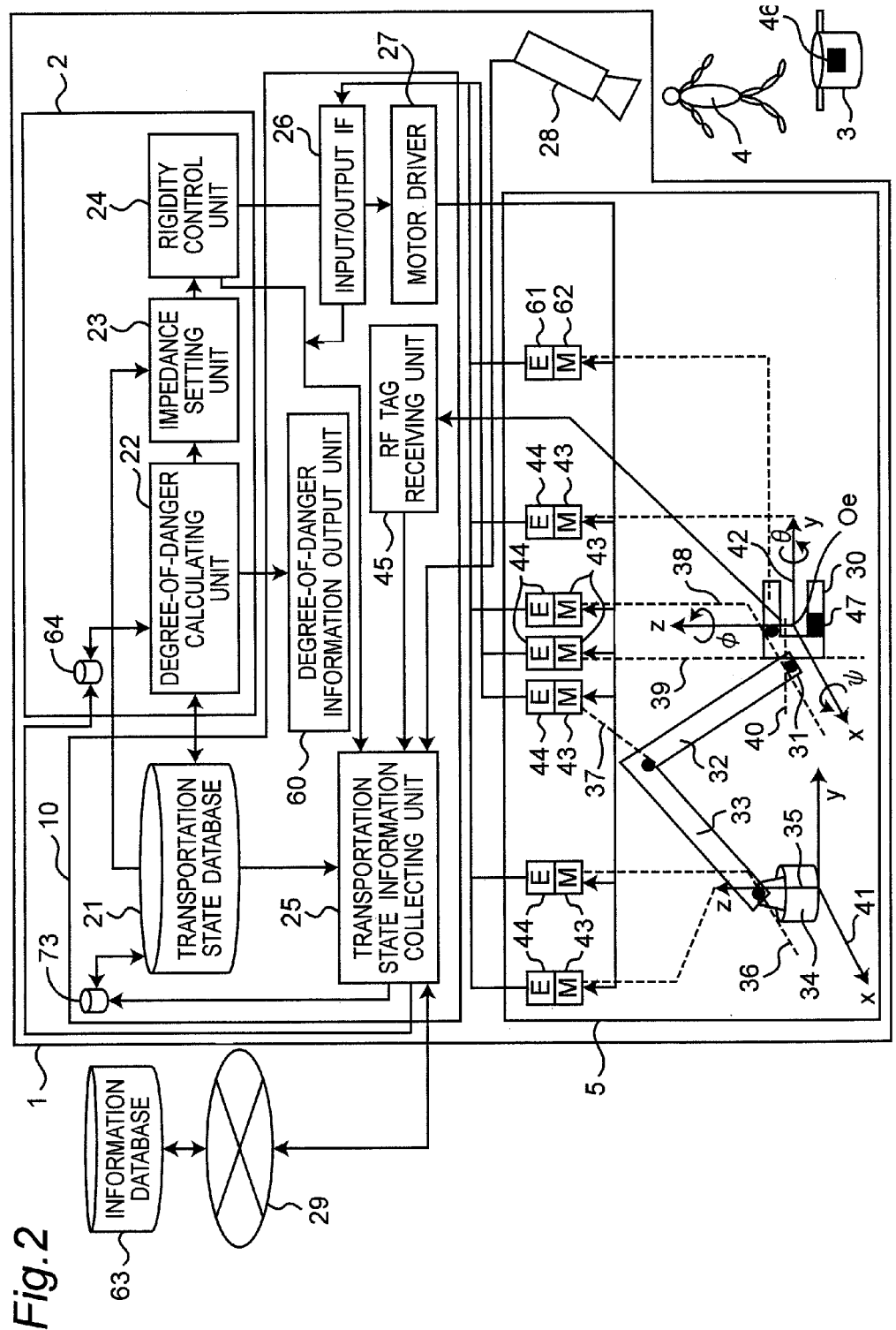
FIG. 2 is a view showing a specific structure of the control device that forms a robot system, and a robot arm as a subject to be controlled, in accordance with the first embodiment of the present invention.

FIG. 2 is a view showing a detailed structure of the control device 2 and the robot arm 5 to be controlled, which constitute the robot system 1.

The control device 2 and its peripheral device 10 are respectively formed by, for example, general personal computers.

The control device 2 is designed so as to have a degree-of-danger calculating unit 22 serving as one example of a degree-of-danger calculating means (degree-of-danger calculating unit), an impedance setting unit 23 serving as one example of an impedance setting means (impedance setting unit), and an impedance control unit 24 serving as one example of a rigidity control means (rigidity control unit) or an impedance control means (impedance control unit) (in FIG. 2, indicated as "rigidity control unit 24"). This control device 2 is designed to carry out such rigidity-controlling operation that, as the degree danger calculated by the degree-of-danger calculation means becomes higher, the rigidity of the robot arm is increased, and as a specific example thereof, an impedance controlling operation is carried out. The peripheral device 10 is provided with a cooperative transportation information database (or a working posture information database) and a transportation state database 21 serving as one example of an object characteristic database, as well as a transportation state information collecting unit 25 serving as one example of an object characteristic collecting means (object characteristic collecting unit) or a cooperative transportation information collecting unit, an input/output IF (interface) 26, a motor driver 27, an RF tag receiving unit 45 and a degree-of-danger information output unit 60.

The input/output IF 26 is designed to have, for example, a D/A board, an A/D board and a counter board, connected to an expansion slot, such as a PCI bus of the personal computer.

The control device 2 and the peripheral device 10 for controlling the operations of the robot arm 5 are activated so that respective pieces of joint-angle information outputted from encoders 44 of respective joint portions of the robot arm 5, which will be described later, are taken up by the control device 2 through the counter board of the input/output IF 26 so that based on the respective pieces of joint-angle information thus taken up, control instruction values to be used for rotation operations of the respective joint portions are calculated by the control device 2. The control instruction values, thus calculated, are given to a motor driver 27 used for drive-controlling the respective joint portions of the robot arm 5 through the D/A board of the input/output IF 26, and motors 43 of the respective joint portions of the robot arm 5 are driven in accordance with the respective control instruction values sent from the motor driver 27. Moreover, a hand driving motor 62, serving as one example of a hand driving device to be drive-controlled by the motor driver 27, and an encoder 61 used for detecting a rotation phase angle of the rotation axis of the hand driving motor 62 are attached to the hand 30 so that, based on the rotation angle detected by the encoder 61, the rotation of the motor 62 is drive-controlled through the motor driver 27 by using a control signal from a hand control unit 54 of the impedance control unit 24 of the control device 2; thus, by rotating the rotation axis of the hand-driving motor 62 reversely as well as forwardly, the hand 30 can be opened and closed.

The robot arm 5 is prepared, for example, as a multi-joint robot arm, which is a multi-link manipulator with six degrees of freedom, and provided with the hand 30, a forearm link 32 having a wrist portion 31 at its tip to which the hand 30 is attached, an upper arm link 33 with its tip being rotatably coupled to the base end of the forearm link 32, and a base portion 34 to which the base end of the upper arm link 33 is rotatably coupled and supported. The base portion 34 is coupled to the rail 8 that can be moved, or this may be secured to a fixed position. The wrist portion 31 has three rotation axes, that is, a fourth joint portion 38, a fifth joint portion 39 and a sixth joint portion 40, so that relative postures (postures) of the hand 30 relative to the forearm link 32 can be changed. That is, in FIG. 2, the fourth joint portion 38 makes it possible to change the relative posture around the lateral axis of the hand 30 relative to the wrist portion 31. The fifth joint portion 39 makes it possible to change the relative posture around the longitudinal axis that is orthogonal to the lateral axis of the fourth joint portion 38 of the hand 30 relative to the wrist portion 31. The sixth joint portion 40 makes it possible to change the relative posture around the lateral axis that is orthogonal respectively to the lateral axis of the fourth joint portion 38 and the longitudinal axis of the fifth joint portion 39 of the hand 30 relative to the wrist portion 31. The other end of the forearm link 32 is allowed to rotate around the third joint portion 37 relative to the tip of the forearm link 33, that is, around the lateral axis in parallel with the lateral axis of the fourth joint portion 38. The other end of the upper arm link 33 is allowed to rotate around the second joint portion 36 relative to the base portion 34, that is, around the lateral axis in parallel with the lateral axis of the fourth joint portion 38, and the upper side movable portion of the base portion 34 is allowed to rotate around the first joint portion 35 relative to the lower side fixed portion of the base portion 34, that is, around the longitudinal axis in parallel with the longitudinal axis of the fifth joint portion 39. As a result, the robot arm 5 is allowed to rotate around the total six axes, and forms a multi-link manipulator with six degrees of freedom.

To each of the joint portions forming the rotating portions of the respective axes, one of the paired members forming each of the joint portions (such as a member on the pivotal side and a member on the supporting side for supporting the pivotal side member) is attached. The motor 43 (actually, installed in the inner portion of each of the joint portions of the robot arm 5) serving as one example of the rotation driving device that is drive-controlled by a motor driver 27, which will be described later, and an encoder 44 (actually, installed in the inner portion of each of the joint portions of the robot arm 5) that detects a rotation phase angle (that is, joint angle) of the rotation axis of the motor 43 are installed so that the rotation axis of the motor 43, installed in one of the members of each of the joint portions, is coupled to the other member of each of the joint portions; thus, by rotating the rotation axis forwardly as well as reversely, the other member is allowed to rotate around each of the axes relative to one of the members.

Reference numeral 41 represents an absolute coordinate system in which the positional relationship relative to the lower side fixed portion of the base portion 34 is fixed, and reference numeral 42 represents a hand coordinate system in which the positional relationship relative to the hand 30 is fixed. Supposing that the origin $O_e$ (x, y, z) of the hand coordinate system 42, viewed from the absolute coordinate system 41, is the hand position of the robot arm 5, and that coordinates ($\phi$, $\theta$, $\psi$), that represent the posture of the hand coordinate system 42, viewed from the absolute coordinate system 41, by using the roll angle, pitch angle and yaw angle, are hand postures of the robot arm 5, the hand position and the posture vectors are defined as vectors r=[x, y, z, $\phi$, $\theta$, $\psi$]$^T$. Consequently, for example, the longitudinal axis of the first joint portion 35 is preferably set in parallel with the z-axis of the absolute coordinate system 41, and the lateral axis of the second joint portion 36 is preferably positioned in parallel with the x-axis. Moreover, the lateral axis of the sixth joint portion 40 is preferably allowed to be positioned in parallel with the x-axis of the hand coordinate system 42, the lateral axis of the fourth joint portion 38 is allowed to be positioned in parallel with the y-axis, and the longitudinal axis of the fifth joint portion 39 is preferably allowed to be positioned in parallel with the z-axis. In this case, the rotation angle relative to the x-axis of the hand coordinate system 42 is defined as the yaw angle $\psi$, the rotation angle relative to the y-axis is defined as the pitch angle $\theta$, and the rotation angle relative to the z-axis is defined as the roll angle $\phi$. In a case where the hand position and posture of the robot arm 5 are controlled, the hand position and posture vectors r are made to follow posture target vectors $r_d$ generated by a target track generating unit 55, which will be described later.

The transportation state information collecting unit 25 functions as one example of a working posture information acquiring means (working posture information acquiring unit), and collects the state of a person 4 (such as a person operating the robot arm 5 so as to cooperate with the robot arm 5) who works in cooperation with the robot arm 5, that is, information (such as working posture information) of cooperative working states (such as working posture, information on body conditions, relative position between the robot arm 5 and the person 4) or characteristic data (characteristic data relating to a transportation state as an example) of a grabbed object 3 (object characteristic information), and inputs the data to the transportation state database 21 so as to be updated and stored. More specifically, as will be described later, the transportation state information collecting unit 25 collects information to be taken into consideration when the person 4 and the robot arm 5 are cooperate to transport an object 3, that is, cooperative transportation information, that has been inputted therein, such as image data from an image pickup device 28, such as a camera, information on RF tag 46 of the grabbed object 3 read by the RF tag reading unit 47 and the RF tag receiving unit 45, body condition information from a body condition measuring unit 70 used for measuring the body conditions of the person 4, which will be described later, center-of-gravity information from the center-of-gravity measuring unit 69 used for measuring the center of gravity of the person 4, which will be described layer, and object information from information database 63 possessed by an external web server, that is given through the Internet 29, and inputs the data to the transportation state database 21 so as to be updated and stored therein. Moreover, to the transportation state information collecting unit 25, joint angle information, outputted from the encoder 44 of each of the joint portions of the robot arm 5 that is connected to the counter board of the input/output IF 26, or information on the object weight given from the impedance control unit 24, or the like is also inputted.

Figure 3:
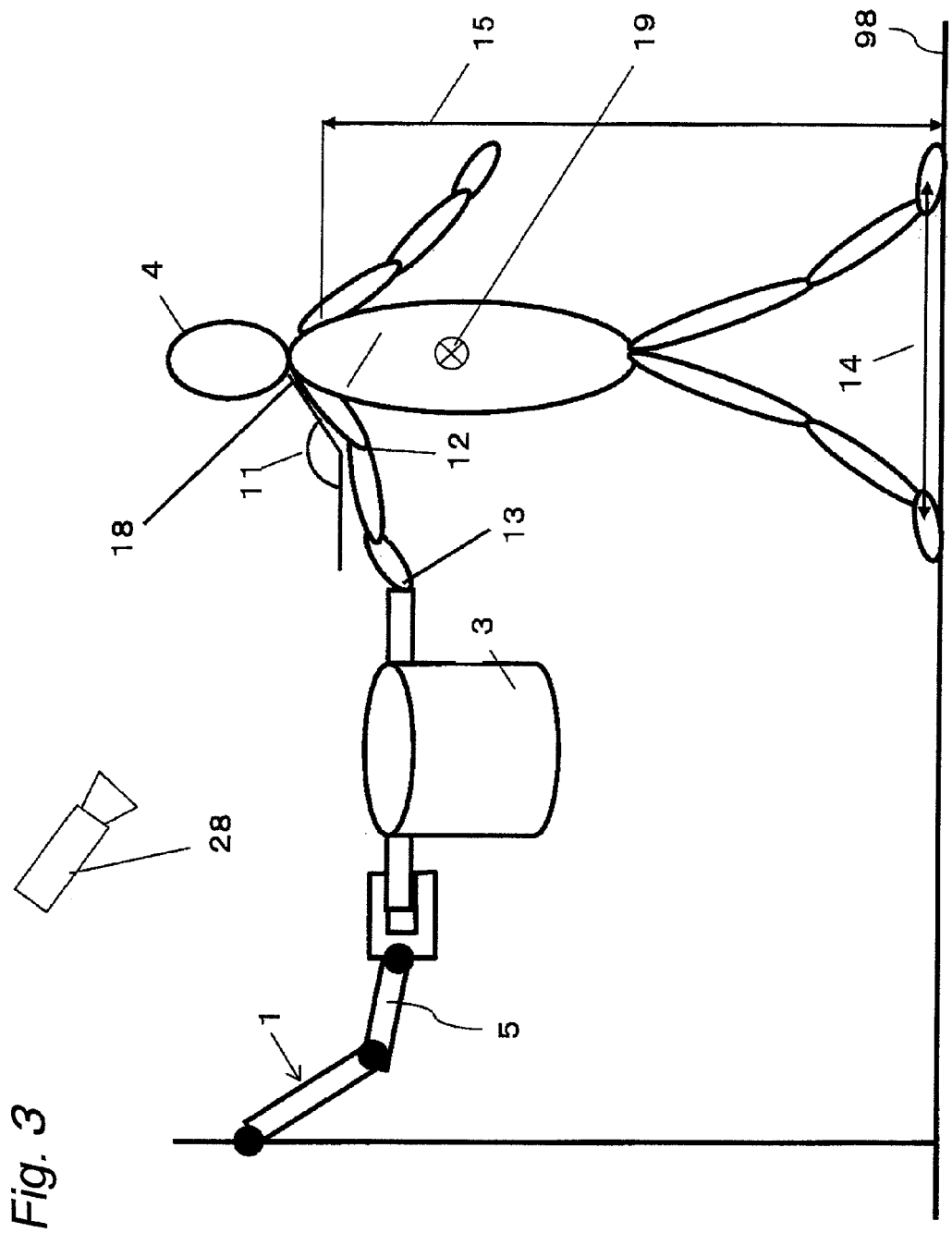
FIG. 3 is a view showing an operation state of the robot control device in accordance with the first embodiment of the present invention.
Figure 7:
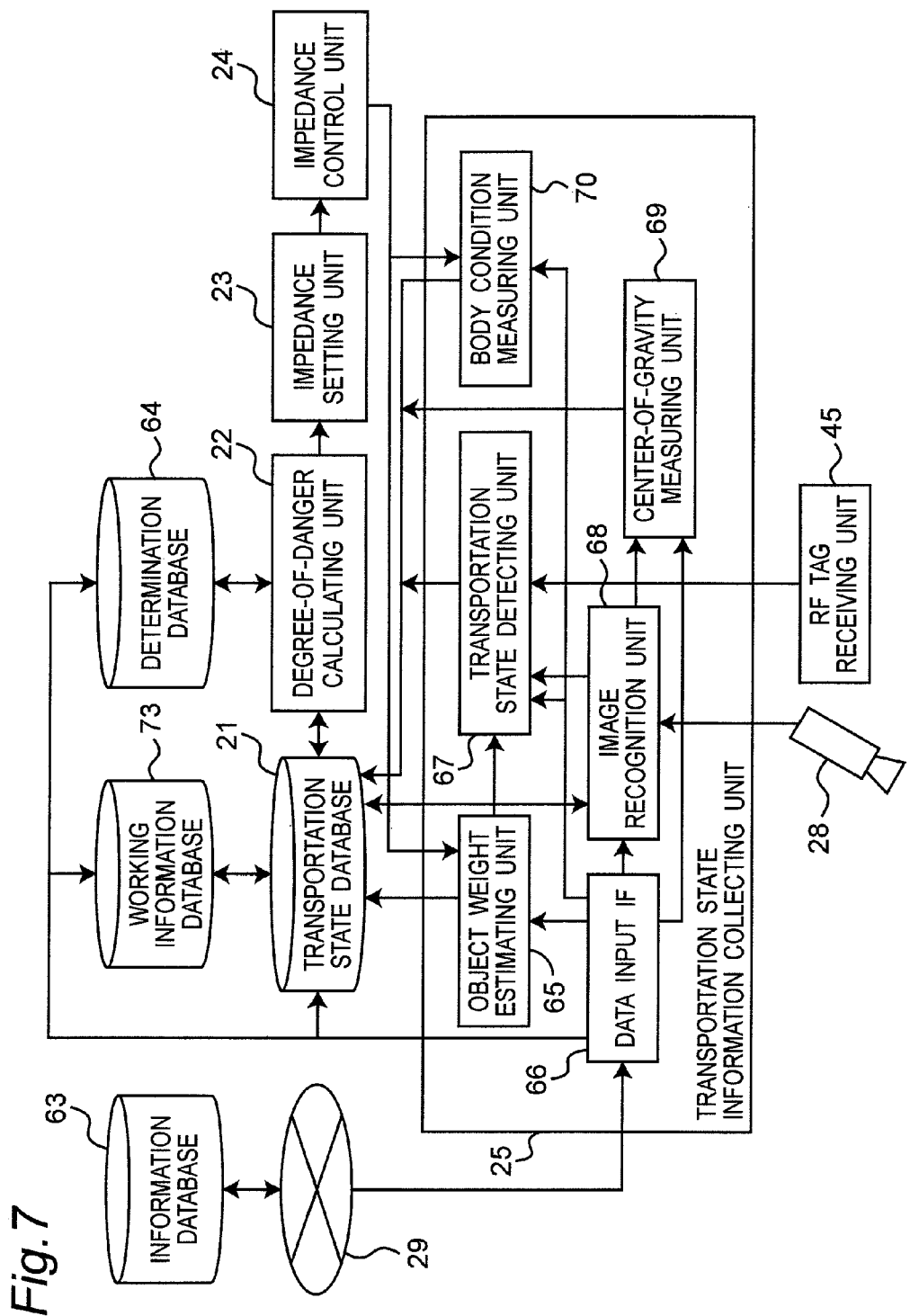
FIG. 7 is a block diagram showing a structure of a transportation state information collecting unit of the control device in accordance with the first embodiment of the present invention.

FIG. 7 shows in detail the transportation state information collecting unit 25 in a case where the person 4 transports the object 3 in cooperation with (work cooperatively) the robot arm 5 as shown in FIG. 3. The transportation state information collecting unit 25 is provided with an object weight estimating unit 65, a data input IF (interface) 66, a transportation state detecting unit 67, an image recognition unit 68, the center-of-gravity measuring unit 69 and the body condition measuring unit 70.

Reference numeral 68 represents the image recognition unit that carries out a model matching process between image data obtained by the image pickup device 28 such as a camera and an image of the grabbed object 3 preliminarily recorded, extracts the dimensions of the grabbed object 3, and outputs the resulting data to the transportation state database 21. Moreover, the image recognition unit 68 extracts pieces of information as to the height of the person 4, as to the elbow position 12 of the arm of the person 4 on the holding side of the grabbed object 3, or as to the hand position 13 of the arm of the person 4 on the holding side of the grabbed object 3, or as to the shoulder position 18 of the person 4 on the holding side of the grabbed object 3, as to the sternum upper edge height 15, that is, the height from the sternum of the person 4 to the floor face 98, as to the length between two feet 14, that is, the distance between the two feet of the person 4, and as to the grabbing hand, that is, information as to which of right and left hands the person 4 is using to grab the grabbed object 3, and outputs the resulting data to the transportation state database 21, and also outputs pieces of information (information on position coordinates) of the elbow position 12, the hand position 13 and the shoulder position 18 to the transportation state detecting unit 67. More specifically, an image of the face of the person upon standing is extracted by the model matching process, and the height is calculated based on the distance from the face to the floor face 98. Next, based on the standard body characteristic model (such as records of the shoulder, the arm length, the elbow position or the like, relative to the height for each sex) of a person 4 preliminarily recorded, the elbow position 12 of the person 4 or the hand position 13 of the person 4, the shoulder position 18 of the person 4, the sternum upper edge height 15, that is, the height from the sternum of the person 4 to the floor face 98, and the length between two feet 14, that is, the distance between the two feet of the person 4, are extracted. Moreover, base upon face models (information in which the positions of eyes, mouths or the like are recorded), the face of the person 4 is extracted, and in a case where the hand position 13 holding the grabbed object 3, detected by the above-mentioned method, is positioned on the left side from the detected face position, "2" is recorded as the holding hand information, and, for example, in a case where it is positioned on the right side from the detected face position, "1" is recorded as the holding hand information, and the resulting data are respectively outputted to the transportation state database 21. Additionally, the height or holding hand information is extracted by the model matching; however, by attaching an RF tag to the head or the holding hand of the person 4, the height or holding hand information may be found based on the position of the RF tag.

Reference numeral 65 represents the object weight estimating unit that estimates the weight of the grabbed object 3. For example, in a case where a force sensor is attached to the wrist portion 31 of the robot arm 5, a value, obtained by subtracting the weight of the hand 30 from the measured value by the force sensor obtained when the robot arm is holding the object 3 and is in a stationary state, is given as the object weight. Moreover, in a case where a force estimating unit 53, which will be described later, is utilized, the object weight estimating unit 65 obtains a torque $\tau_{ext}$ to be generated in each of the joint portions when the robot arm 5 holds the object 3 and is maintained in a stationary state, from the force estimating unit 53, and finds a torque required for the robot arm 5 to maintain its position and state from a motion equation of the robot arm 5 so that the torque value after the subtraction is converted to a force exerted onto the hand, and this force is defined as the object weight.

Reference numeral 66 represents a data input IF (interface) that is an interface through which a person can input attribute data (attribute information) of an object corresponding to information such as a degree of sharpness of the grabbed object 3, which will be described later, by using an input device such as a keyboard, a mouse, or a microphone, or can receive an instruction for starting or completing the object transportation from the person 4 by using an input device such as a button 66. As the button 66, for example, a single button serving as a toggle switch may be used so as to input the object transportation start and the object transportation completion, or an object transportation starting button and an object transportation completing button may be installed separately.

Figures 16, 17:
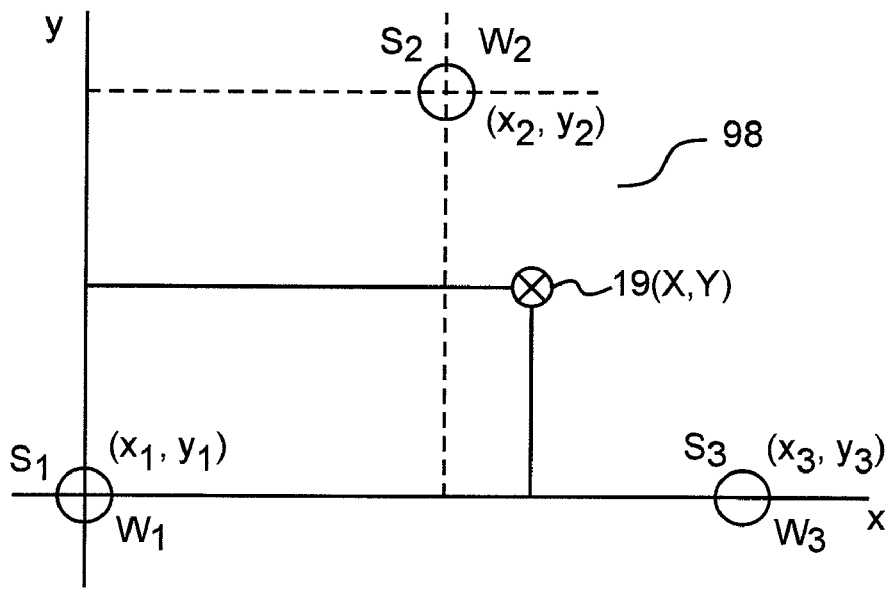
FIG. 16 is an explanatory graph with use of xy coordinates of a load sensor disposed on a floor face so as to describe a center-of-gravity measuring unit in accordance with the first embodiment of the present invention.
FIG. 17 is a table showing a threshold value of a frequency in a body-condition measuring unit in accordance with the first embodiment of the present invention.

Reference numeral 69 represents a center-of-gravity measuring unit that measures the center-of-gravity coordinates 19 {center-of-gravity coordinates r g(X,Y)} of the person 4 who is operating the robot arm 5, and outputs the resulting data to the transportation state database 21. For example, as described in a reference book ("Basic Human Engineering" written by Koichi Ogawa, published by Shinnihon Printing Inc.), the center-of-gravity measuring unit 69 has a structure in which, as shown in FIG. 16, a plurality of load sensors (such as three sensors of $S_1$, $S_2$ and $S_3$) are disposed on a floor surface 98 so that the coordinates of the load sensor $S_1$ are set to $(x_1, y_1)$, the coordinates of the load sensor $S_2$ are set to $(x_2, y_2)$, and the coordinates of the load sensor $S_3$ are set to $(x_3, y_3)$ respectively. Moreover, supposing that the forces to be found from the load sensors $S_1$, $S_2$ and $S_3$ are $W_1$, $W_2$ and $W_3$ respectively, that the body weight of the person 4 is W, and that the coordinates $(x_1, y_1)$ of the load sensor $S_1$ correspond to the origin (0, 0) in the xy coordinates on the floor surface 98, the center-of-gravity position 19 (the coordinates of which are represented by (X, Y)) of the person 4 in the xy coordinates on the floor surface 98 are calculated by the following expressions (1) and (2):

[Equation 1]

$$X = \frac{W_2 \times x_2 + W_3 \times x_3}{W_1 + W_2 + W_3} \qquad \text{Expression (1)}$$

[Equation 2]

$$Y = \frac{W_2 \times y_2}{W_1 + W_2 + W_3} \qquad \text{Expression (2)}$$

Reference numeral 70 represents the body condition measuring unit that measures the heart rate, blood pressure and body temperature of the person 4 who is operating the robot arm 5, and outputs the resulting data to the transportation state database 21 together with the date and time of the measurements. More specifically, a heart rate meter, a clinical thermometer and a blood pressure gauze are disposed on the hand of the robot arm 5, and the heart rate, the blood pressure and the body temperature upon the transportation start are measured, and the resulting data are outputted to the transportation state database 21 together with the date and time of the measurements. Moreover, the body condition measuring unit 70 estimates the degree of vibration corresponding to the degree of trembling of the hand of the person 4, and outputs the resulting data to the transportation state database 21. In a case where, for example, a force sensor is placed on the wrist portion 31 of the robot arm 5, a Fourier transform is applied to measured values by the force sensor for a fixed period of time (more specifically, about 10 seconds), and when values of frequency components exceeding a certain frequency (more specifically, several Hz) are located above the threshold value corresponding to an age indicated in FIG. 17 within a certain period of time, as shown in FIG. 18, based on the value obtained by subtracting the value of several Hz (value in the column indicated by reference numeral 18a in FIG. 18) corresponding to the frequency, stages of 1 to 5 are respectively set, and the resulting data are outputted to the transportation state database 21 together with the date and time of the measurements.

Reference numeral 67 represents the transportation state detecting unit that estimates the elbow joint angle 11 from the elbow position 12, the hand position 13 and the shoulder position 18 of the person 4 obtained by the results of the image recognition of the image recognition unit 68 (for example, estimates the angle, made by a line segment connecting the elbow position 12 and the hand position 13 and a line segment connecting the elbow position 12 and the shoulder position 18, as an elbow joint angle 11), and outputs the resulting data to the transportation state database 21. Moreover, in a case where a plurality of grabbed objects are simultaneously grabbed, the grabbed state is estimated and detected from information on the relative positional relationships of the plurality of the grabbed objects obtained from the results of image recognition of the image recognition unit 68 or combined pieces of information of ID information (ID data) such as ID numbers of the grabbed objects obtained by the RF tag receiving unit 45, and the resulting data are outputted to the transportation state database 21.

In this manner, the transportation state information collecting unit 25 is provided with the image recognition unit 68, the object weight estimating unit 65, the data input IF (interface) 66, the transportation state detecting unit 67, the center-of-gravity measuring unit 69 and the body condition measuring unit 70 so that the respective functions are obtained from the respective means (units) or the respective members, and such functions as to input the information on the RF tag 46 of the object 3 read by the RF tag receiving unit 45 to the transportation state database 21, and as to access object information possessed by an external web server through the Internet 29 so that the object characteristic data are inputted to the transportation state database 21, are also obtained.

The following description will discuss the transportation state database 21 in detail. The transportation state database 21 is designed to obtain pieces of information to be taken into consideration when the person 4 and the robot arm 5 transport an object 3 in cooperation with each other, that is, cooperative transportation information, such as object information on various objects 3 located within an working environment in which the robot arm 5 is placed as shown in FIG. 8, and information on the working states of the person 4 who is operating the robot as shown in FIG. 9, and is also allowed to function as the working posture information database, the relative position information database, the body condition information database and the relative position information database.

As shown in FIG. 8, the object information (object characteristic information) is designed to be provided with ID information, physical characteristic information, attribute information and a name of an object 3. For example, the ID information includes an ID number by which the object 3 is identified. For example, pieces of physical characteristic information corresponding to the respective ID numbers include weight information, dimension information and hardness information on the object 3. For example, pieces of attribute information corresponding to the respective ID numbers include degree-of-sharpness information and degree of importance. Reference numerals 8a and 8b shown in FIG. 8 respectively represent examples of the object information, and in the case of the same ID number (0002), and these reference numerals indicate states that change in various ways with time, such as a state in which nothing is in a pan (in the case of reference numeral 8a) and a state in which water is put in the pan (in the case of reference numeral 8b). These data of the weight information, dimension information, hardness information, degree-of-sharpness information and degree of importance information are preliminarily measured, and evaluated and stored in the transportation state database 21 as database.

With respect to the weight information, the weight of the object 3 is estimated by the object weight estimating unit 65, and the resulting data can be stored in the transportation state database 21. Moreover, for example, in a case where water is poured into a pan serving as one example of the object 3 grabbed by the robot arm 5, since the increase of the weight of the object 3 by the poured water can be estimated by the object weight estimating unit 65, an updating process of the weight information in response to an increase or a decrease of the weight can be carried out. For example, the pan serving as one example of the object 3 of the ID number 0002 of FIG. 8 has a weight of 0.8 in the case of the reference numeral 8a, while it has a weight of 1.5 in the case of the reference numeral 8b, so that it is estimated that the pan with the reference numeral 8b has water or the like that has been poured thereto.

With respect to the dimension information, the image-pickup device 28 and the image recognition unit 68 may be installed, and by carrying out an image recognition by the image recognition unit 68 based on image data obtained by the image pickup device 28, the dimension of the object 3 is detected; thus, the dimension information can be newly stored in the transportation state database 21 so as to be updated.

With respect to the hardness information, evaluating processes of five stages including levels 1 to 5 can be carried out in response to the hardness of the object 3. Based on the material of the object 3, for example, an object made of metal is evaluated as "level 5" that is the highest hardness, an object made from a resin such as plastics is evaluated as "level 3" that is in the middle, and an object made from a soft material, such as paper or towel, is evaluated as "level 1" that is the lowest hardness; thus, the resulting data are recorded as the hardness information. For example, in FIG. 8, "kitchen knife" and "pan" correspond to "level 5" having the highest hardness, "glass tumbler" corresponds to "level 4", and "towel" corresponds to "level 1". Moreover, the hardness may be evaluated from the viewpoint of vulnerability to breakage. An object, such as a glass tumbler or pottery, that is highly possible to be broken when comes into contact with another object, is evaluated as "level 5", an object made from a resin such as plastics that tends to be deformed upon collision or the like with another object is evaluated as "level 3" that is in the middle, and an object made of iron or the like, such as a frying pan, that is hardly broken may be evaluated as "level 1". These pieces of hardness information may be preliminarily determined by a person, or may be automatically determined based on ID information recorded in the RF tag 46 of the object, and level evaluation and setting are carried out; thus, the resulting data are inputted to the transportation state database 21 through the data input IF 66.

With respect to the degree of sharpness information, for example, evaluation values of five stages including levels 1 to 5 are given, and recorded. For a specific example for evaluation values, an object 3, such as an edged tool, that is highly dangerous and required for most careful handling by the robot arm 5 is evaluated as "level 5" that is the highest degree of sharpness, while an object 3 that is made from papers or towel, and is soft so that it is considered that no harm is given even when comes into contact with a person is evaluated as "level 1" that is the lowest degree of sharpness. These pieces of the degree of sharpness information are preliminarily determined by a person, and level evaluation and setting are carried out, and the resulting data are inputted to the transportation state database 21 through the data input IF 66.

With respect to the degree of importance information, for example, evaluation values of five stages including levels 1 to 5 are given, and recorded. For a specific example for evaluation values of the degree of importance, an object 3, such as an expensive piece of tableware, or valuable pottery, or a memorable piece of tableware that is not so expensive, but valuable to the owner, that is highly important and required for most careful handling by the robot arm 5 is evaluated as "level 5" that is the highest degree of importance, while an object, such as a pan or towel, that is easily replaced by a substitute even when it is damaged, or an object whose spare substitute is normally available in home, or an object, such as trash, that is considered to be not so important, is evaluated as "level 1" that is the lowest degree of importance. These pieces of the degree of importance information are preliminarily determined by a person, and level evaluation and setting are carried out, and the resulting data are inputted to the transportation state database 21 through the data input IF 66. Additionally, with respect to objects that are highly valuable to the owner, RF tags may be attached to these, and these may be preliminarily determined and evaluated by the owner.

As shown in FIG. 9, the information on working states of the person 4 is designed to include ID information, measuring date and time information, body characteristic information, posture information and body condition information. For example, the ID information includes an ID number that identifies the person 4, and pieces of information on the age, or sex, or name of the person 4 corresponding to the ID number. For example, the body characteristic information corresponding to the ID number includes information on the height or weight of the person 4. For example, the posture information includes pieces of information on the hand position 13 of the person 4, the elbow position 12 of the person 4, the shoulder position 18 of the person 4, the length between two feet 14, that is, the distance between the two feet of the person 4, the elbow joint angle 11 of the person 4, the sternum upper edge height 15, that is, the height from the sternum of the person 4 to the floor face 98, and the center-of-gravity coordinates 19 of the person 4. In addition to these, for example, the body condition information is composed of pieces of information on the degree of vibration corresponding to the degree of trembling of the hand of the person 4, the heart rate, the body temperature and the blood pressure. These data of the body characteristic information, posture information and body condition information are preliminarily measured by the body condition measuring unit 70, and evaluated and then sent through the transportation state database 21, and stored in the work information database 73 that is connected to the transportation state database 21 as database. Moreover, reference numerals 9a and 9b shown in FIG. 9 respectively represent examples of the data of the body characteristic information, posture information and body condition information, and in the case of the same ID number, these reference numerals indicate the working states of the person 4 that are changing in various ways with time.

For example, as shown in FIG. 9, the body characteristic information is designed to include pieces of information on the height or weight and the dominant hand of the person 4 who is operating the robot arm 5. With respect to the information on the height, since the image-pickup device 28 and the image recognition unit 68 are installed, by carrying out an image recognition by the image recognition unit 68 based on image data obtained by the image pickup device 28, the height is found, and the resulting data can be newly stored in the transportation state database 21 so as to be updated. Moreover, the information on the weight may be inputted to the transportation state database 21 by the person 4 through the data input IF 66, or the weight of the person 4 detected by the load sensor may be inputted to the transportation state database 21 as the corresponding weight through the center-of-gravity measuring unit 69. Furthermore, the height may also be inputted to the transportation state database 21 by the person 4 through the data input IF 66. The information on the dominant hand is inputted to the transportation state database 21 by the person 4 through the data input IF 66. In this case, for example, "1" is inputted in the case of the right handed person, and "2" is inputted in the case of the left handed person.

For example, as shown in FIG. 9, the posture information is designed to include pieces of information on the hand position 13 of the person 4 who is operating the robot arm 5, the elbow position 12 of the person 4, the shoulder position 18 of the person 4, the length between two feet 14, that is, the distance between the two feet of the person 4, the sternum upper edge height 15, that is, the height from the sternum of the person 4 to the floor face, the elbow joint angle 11 of the person 4, the center-of-gravity coordinates 19 of the person 4, and the grabbing hand, that is, as to which of right and left hands the person 4 is using to grab the grabbed object 3. With respect to the pieces of information on the hand position 13, the elbow position 12, the shoulder position 18, the sternum upper edge height 15 and the length between two feet 14, since the image-pickup device 28 and the image recognition unit 68 are installed, by carrying out an image recognition by the image recognition unit 68 based on image data obtained by the image pickup device 28, the respective pieces of information are found, and these pieces of information can be newly stored in the transportation state database 21 so as to be updated. Moreover, these pieces of information may be inputted to the transportation state database 21 by the person 4 through the data input IF 66.

The information on the center-of-gravity coordinates 19 may be measured by the center-of-gravity measuring unit 69, and the resulting data may be newly stored in the transportation state database 21 so as to be updated.

The information on the elbow joint angle 11 may be measured by the transportation state detecting unit 67, and the resulting data may be newly stored in the transportation state database 21 so as to be updated.

For example, as shown in FIG. 9, the body condition information is designed to include pieces of information on the degree of vibration corresponding to the degree of trembling of the hand of the person 4 who is operating the robot arm 5, the heart rate, the body temperature and the blood pressure. These pieces of body condition information may be measured by the body condition measuring unit 70, and the resulting data may be newly stored in the transportation state database 21, or may be allowed to update the data. Moreover, these pieces of information may be inputted to the transportation state database 21 by the person 4 through the data input IF 66. Furthermore, these pieces of information may be recorded together with measured date and time obtained from a clock installed in the computer (for example, installed in the body condition measuring unit) so that the history management is available.

Figure 10:
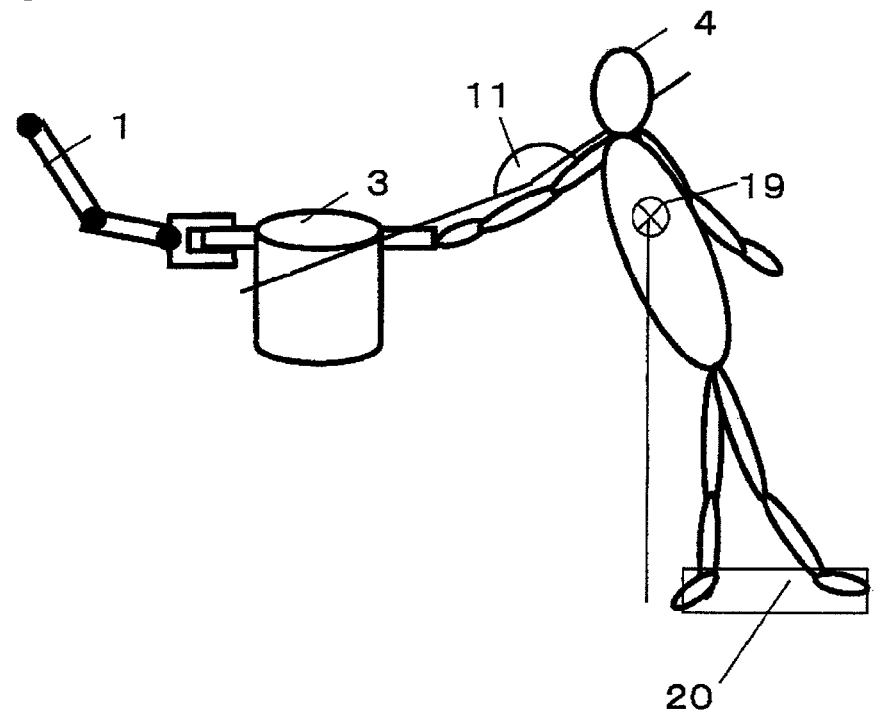
FIG. 10 is a view showing an operation state of the robot control device in accordance with the first embodiment of the present invention.

Reference numeral 22 represents the degree-of-danger calculating unit that calculates the degree of danger based on information on the work conditions of the person 4 recorded in the work information database 73 connected to the transportation state database 21 and the determination database 64 that stores information used for determining the degree of danger. FIGS. 19A and 19B show specific examples of the determination database 64, and the degree of danger is calculated by the degree-of-danger calculating unit 22 from pieces of information on the elbow joint angle 11 of the operating person 4 or the position 13 of the hand of the person 4 and the degree of stability of the center of gravity, which will be described later, as well as from pieces of information on the degree of stability of the body condition, such as the holding hand of the grabbed object 3, the degree of trembling of the hand, or the heart rate, and is recorded in the determination database 64 as evaluated values of five stages from level 1 to level 5. For example, as shown in FIG. 10, in a case where the elbow joint angle 11 of the person 4 is 160 degrees or more (indicated by reference numeral A2 in FIG. 19), it is determined that the arm is extended to its full extent, and the degree-of-danger calculating unit 22 determines that this posture is dangerous because hardly any force is exerted by the hand in an attempt to transport (cooperatively transport) the object in cooperation with the robot arm 5, so that this state is determined by the degree-of-danger calculating unit 22 as "level 5". In contrast, in a case where the elbow joint angle 11 of the person 4 is in a range of 0 to 100 degrees (indicated by reference numeral A1 in FIG. 19A), this state is determined by the degree-of-danger calculating unit 22 as "level 1" because the arm is properly bent so as to carry out a stable transporting operation.

For example, supposing that "level 1" in FIG. 19A or 19B, which is small in the degree of danger, is a standard state, in a case where, as the degree of danger calculated by the degree-of-danger calculating means 22 becomes greater, the robot arm is controlled so as to increase its rigidity, the rigidity may be controlled to be set to any one of "level 2" to "level 5" in FIG. 19A or 19B.

Figure 11:
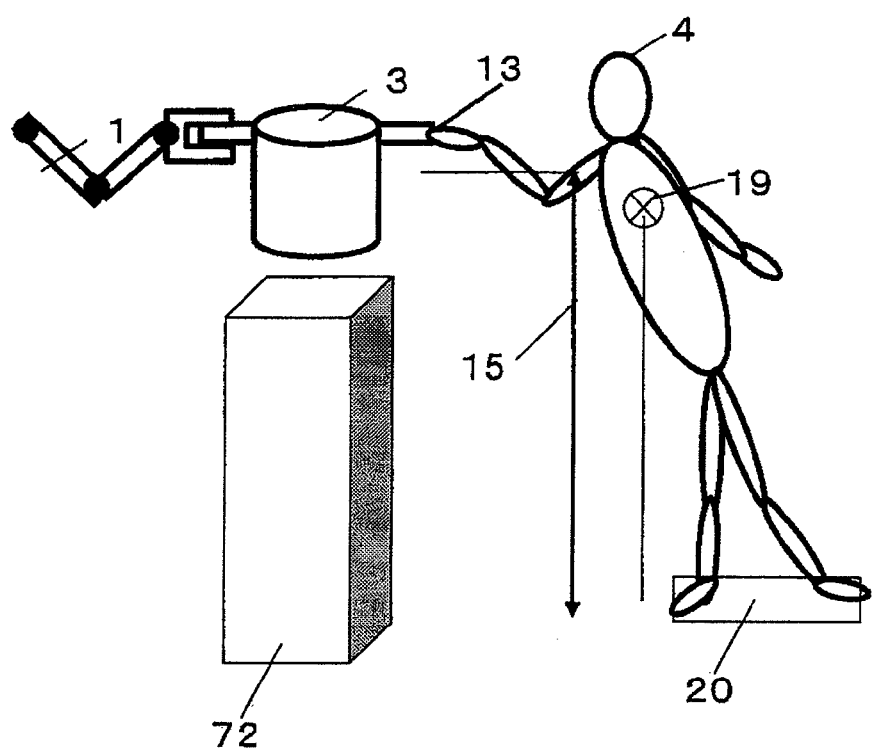
FIG. 11 is a view showing another operation state of the robot control device in accordance with the first embodiment of the present invention.

Moreover, as shown in FIG. 11, in a case where the height of the hand position 13 of the person 4 is located above (such as 0.1 meter or more above) the sternum upper edge height 15 (indicated by reference numeral A4 in FIG. 19A), it is determined that this posture is dangerous because hardly any force is exerted in an attempt to transport (cooperatively transport) the object in cooperation with the robot arm 5, and the degree-of-danger calculating unit 22 determines this state as "level 5". In contrast, in a case where the height of the hand position of the person 4 is located below (such as −0.2 m or less) the sternum upper edge height 15 (indicated by reference numeral A3 in FIG. 19A), this state is determined by the degree-of-danger calculating unit 22 as "level 1" because the hand position 13 is located below the sternum upper edge height 15 so that a stable transporting operation is carried out.

Figure 12:
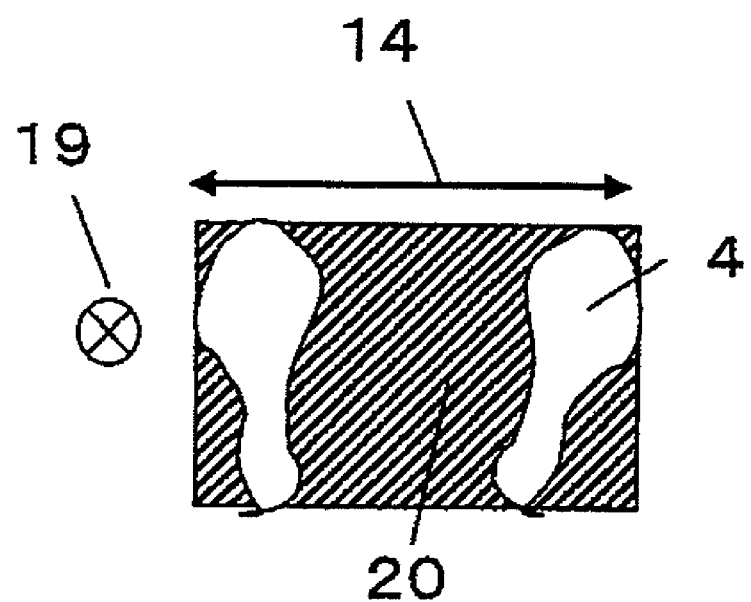
FIG. 12 is a view showing a relationship between center-of-gravity coordinates of a person and a supporting base surface in accordance with the first embodiment of the present invention.

FIG. 12 is a view showing the two feet of the person 4 viewed from above. Reference numeral 20 that corresponds to a region with slanting lines indicates a supporting base face, and this region is found by the degree-of-danger calculating unit 22 from the length between two feet 14. In a case where the center-of-gravity position 19 is within the supporting base face 20 (indicated by reference numeral A5 in FIG. 19A), since the posture is stable, the degree of stability in center-of-gravity is determined by the degree-of-danger calculating unit 22 as "level 1", while in a case where it is out of the supporting base face 20 (in cases other than the case indicated by reference numeral A5 in FIG. 19A), the level of the degree of stability in center-of-gravity is determined by the degree-of-danger calculating unit based on the distance of the center-of-gravity position 19 from the supporting base face 20. For example, when it is apart from the supporting base face 20 by 1 m (indicated by reference numeral A6 in FIG. 19A), this state is determined by the degree-of-danger calculating unit 22 as "level 5".

Moreover, in a case where information on the dominant hand in the transportation state database 21 is different from the information on the holding hand in the transportation state database 21 (in such a case where a right handed person is using the left hand to grab), it is determined that this posture is dangerous because hardly any force is exerted in an attempt to transport (cooperatively transport) the object in cooperation with the robot arm 5, and the degree-of-danger calculating unit 22 determines this state as "level 5". In contrast, in a case where the dominant hand is the same as the hand grabbing the object 3 to be grabbed (in such a case where a right handed person is using the right hand to grab), this state is determined by the degree-of-danger calculating unit 22 as "level 1" because a safe transporting operation is carried out (cooperatively executed) in cooperation with the robot arm 5.

With respect to the degree of stability of the body condition, for example, in a case where the degree of vibration that indicates trembling of the hand of the person 4 is high, that is, for example, when the degree of vibration is "5", this state is evaluated as "level 5" as shown in column A7 of FIG. 19B, while in a case where the degree of vibration is low, that is, for example, when the degree of vibration is "1", this state is evaluated as "level 1" as shown in column A8 of FIG. 19B. Moreover, as shown in column A8 of FIG. 19B, in a case where the heart rate is high, for example, 120 or more, this state is evaluated as "level 5", while in a case where the heart rate is low, for example, 70 or less, this state is evaluated as "level 1". With respect to the body temperature, in the case of a high temperature of 40° C. or more as shown in A9 of FIG. 19B, this state is evaluated as "level 5", while in the case of a normal temperature of 37.5° C. or less, this state is evaluated as "level 1". With respect to the blood pressure, in a case where, as shown in A10 of FIG. 19B, the upper level is 180 mmHg or more, with the lower level being 110 mmHg or more, this state is evaluated as "level 5", while in a case where the upper level is 140 mmHg or less, with the lower level being 90 mmHg or less, this state is evaluated as "level 1". Additionally, as shown in A10, the blood pressure may be changed in its reference value relative to levels, in accordance with the age or the state of sickness of the operating person. Moreover, the body condition information may be determined based on deviations from numeric values recorded in the past.

Moreover, the determination database 64 may be inputted while accessing to an information database 63 such as guideline information determined by external experts, through the Internet 29.

In a case where, with respect to the degree of danger calculated by the degree-of-danger calculating unit 22, all the weight, dimension, hardness, degree of sharpness and degree of importance of an object 3 are not more than certain threshold values, the degree of danger is lowered, for example, from "level 5" to "level 4". With this arrangement, since, in a case where, for example, a light object such as a towel is being transported, the degree of danger is low even when a misoperation occurs in a bad state in the posture, the degree of danger is lowered so that the robot arm 5 can be operated more flexibly. Additionally, as to which factors among the weight, dimension, hardness, degree of sharpness and degree of importance should be preferentially dealt with, determinations are made based on gain values obtained from expressions (3) to (5) in the impedance setting unit 23, which will be described later.

For example, when, even in the case of the same weight, an attempt is made to distinguish those cases in which, for example, boiling water is put in a pan, and in which water is put in the pan, information (see FIG. 8) of the temperature of an object may be included in physical characteristics so that, as the temperature becomes higher, the degree of importance (in other words, the degree of danger) is made higher. Moreover, as the weight of an object becomes greater, the degree of importance (in other words, the degree of danger) may be set higher.

Moreover, with respect to all the pieces of information in the transportation state database 21, information on transportation states may be obtained by accessing to the information database 63 possessed by an external web server or the like through the Internet 29, by using the transportation information collecting unit 25, so that respective pieces of information inside the transportation state database 21 can be updated.

Reference numeral 60 represents a degree-of-danger information output unit that forms a display unit, such as a display device, for example, attached to the robot arm 5, and the degrees of danger, calculated by the degree-of-danger calculating unit 22, are displayed thereon by using numeric values, or graphs, colors or the like, separately depending on the degrees of danger. Moreover, prior to altering the state of the robot arm 5, a warning may be given by an alarm sound, for example, by using a voice output device as one example of the degree-of-danger information output unit, that is, as one example of an informing means (informing unit), the degree of danger may be informed, for example, by giving voice information, such as "the arm is going to become parallel". With this arrangement, even if the posture of the robot arm 5 is suddenly changed, the corresponding load to be given to the operating person 4 can be reduced.

Next, the following description will discuss the impedance setting unit 23 in detail. Based on the degrees of danger calculated in the degree-of-danger calculating unit 22 and the characteristic data of an object 3, the impedance setting unit 23 sets mechanical impedance set values of the robot arm 5. The setting parameters of the mechanical impedance set values include inertia M, viscosity D and rigidity K. The respective parameters of the mechanical impedance set values are set based on the following evaluation expressions.

[Equation 3]

$$M = KMa \times (\text{degree of danger}) + KMm \times (\text{weight [kg]}) + KMl \times (\text{dimension [m]}) + KMk \times (\text{hardness}) + KMd \times (\text{degree of sharpness}) + KMp \times (\text{degree of importance}) \quad \text{Expression (3)}$$

[Equation 4]

$$D = KDa \times (\text{degree of danger}) + KDm \times (\text{weight [kg]}) + KDl \times (\text{dimension [m]}) + KDk \times (\text{hardness}) + KDd \times (\text{degree of sharpness}) + KDp \times (\text{degree of importance}) \quad \text{Expression (4)}$$

[Equation 5]

$$K = KKa \times (\text{degree of danger}) + KKm \times (\text{weight [kg]}) + KKl \times (\text{dimension [m]}) + KKk \times (\text{hardness}) + KKd \times (\text{degree of sharpness}) + KKp \times (\text{degree of importance}) \quad \text{Expression (5)}$$

In the above-mentioned expressions (3) to (5), KMa, KMm, KMl, KMk, KMd, KMp, KDa, KDm, KDl, KDk, KDd, KDp, KKa, KKm, KKl, KKk, KKd and KKp are gains, and correspond to certain constant values respectively.

The impedance setting unit 23 outputs the inertia M, viscosity D and rigidity K, that is, the mechanical impedance parameters calculated based on the expressions (3) to (5), to the impedance control unit 24.

In a case where, for example, the degree of danger is high because of a bad working posture of the person 4, the inertia M is set to a great value by the expressions (3) to (5), and the robot arm 5 gives a feeling of weight that is proportional to the value of the degree of danger, with the result that a great force is required to move the robot arm 5, and the robot arm 5 consequently becomes unmovable even upon application of a slight force thereto by the hand. In contrast, in a case where the person 4 operates the robot arm 5 in a stable posture, the degree of danger becomes smaller, and since the inertia M is set to a small value, the robot arm 5 can be moved easily even by a weak force. Moreover, in a case where a heavy object 3 or an object 3 with a large dimension is grabbed in a bad posture, since the rigidity M is set to a great value by the expression (3), and the robot arm 5 gives a feeling of weight that is proportional to the value of the degree of danger, the weight of the object 3 and the dimension, with the result that a greater force is required to move the robot arm 5, and the robot arm 5 consequently becomes unmovable even upon application of a slight force thereto by the hand. In contrast, in the case of grabbing a light object 3 or an object 3 with a small dimension in a bad posture, since the degree-of-danger calculating unit 22 sets the degree of danger to a low value, the inertia M is also set to a low value by the expression (3), and since the robot arm 5 gives a feeling of weight that is proportional to the weight of the object 3, the robot arm 5 can be moved easily even by a weak force. Moreover, in a case where a sharp object such as an edged tool or a hard object made of metal, or an object having a high degree of importance is transported in a bad posture, since the viscosity D and rigidity K are set to great values, the robot arm 5 gives a feeling of resistance or hardness in its movements to become hardly movable. In contrast, in a case where an object 3 such as a towel that is low in the degree of sharpness, and set to be low in the degree of importance is transported in a bad posture, since the degree-of-danger calculating unit 22 sets the degree of danger to a low value, the viscosity D and rigidity K are also set to low values so that the robot arm 5 can be moved easily even under a bad posture.

In a case where an object 3 is grabbed by a plurality of persons simultaneously in cooperation with the robot arm 5, by using an average value of the degrees of danger of the respective persons, calculations of the mechanical impedance setting values are carried out. Additionally, in a case where a child is operating in a stable posture, while an adult is operating in an unstable posture, by applying weights to the degree of danger depending on children, adults and the like, the degree of danger for the adult is set more preferentially than the degree of danger for the child so that the operation by the adult can be preferentially carried out.

Figure 13:
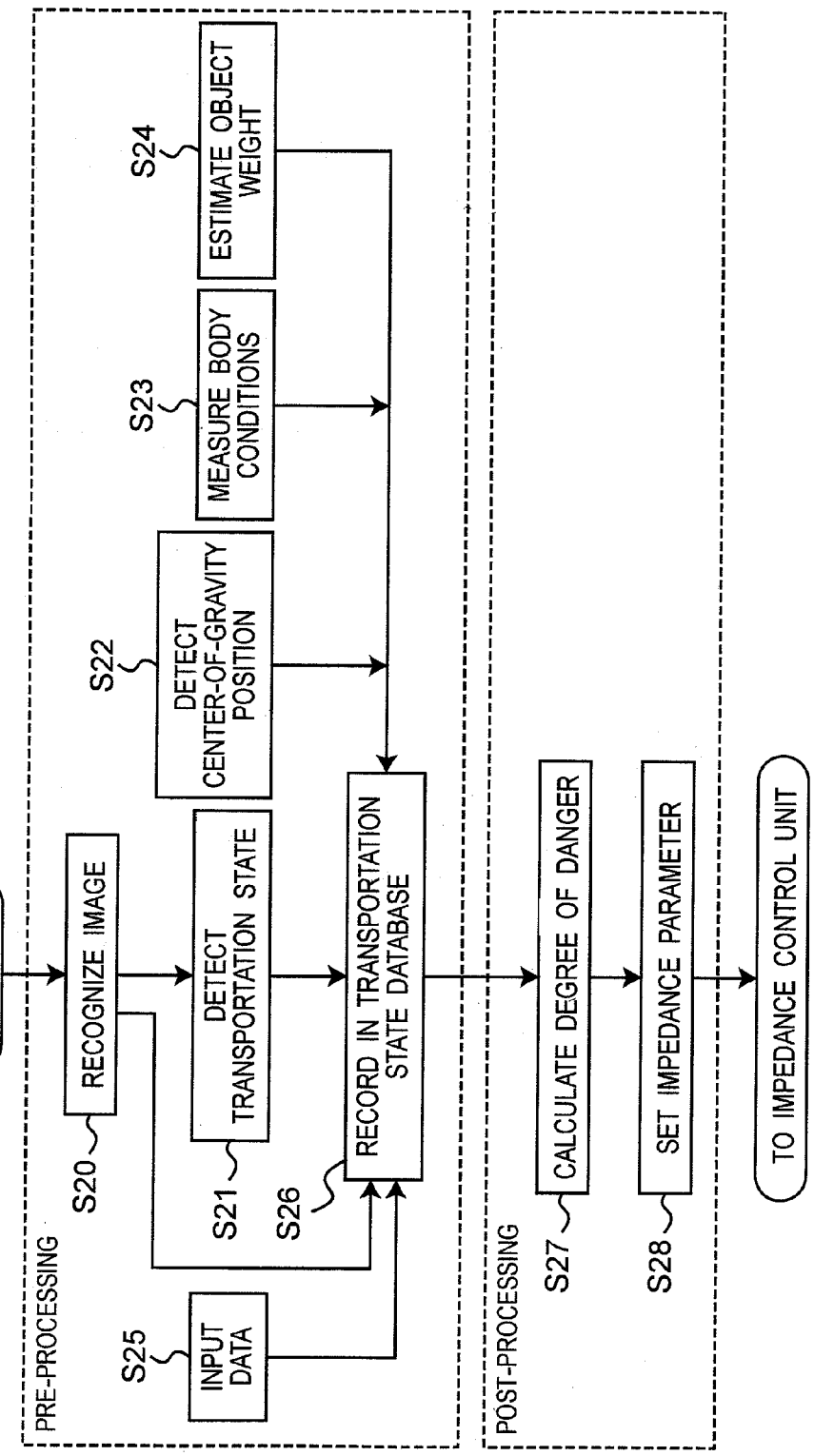
FIG. 13 is a flow chart showing operation steps of the transportation state information collecting unit, the transportation state database, a degree-of-danger calculating unit, and an impedance setting unit, of the control device in accordance with the first embodiment of the present invention.

Referring to a flow chart of FIG. 13, the following description will discuss operation steps of the above-mentioned transportation state information collecting unit 25, the transportation state database 21, the degree-of-danger calculating unit 22 and the impedance setting unit 23.

As a pretreatment of the operation steps, a person 4 who is operating a robot arm 5 or an object 3 is photographed by the image-pickup device 28 upon receipt of an instruction for starting an object transportation from the person 4 through the data input IF 66 such as a button, and based on the resulting image data, an image recognition process is carried out by the image recognition unit 68 (step S20). The dimension of the grabbed object 3, the height of the person 4, the elbow position 12 of the person 4, the hand position 13 of the person 4, the shoulder position 18 of the person 4, the sternum upper edge height 15 of the person 4 and the length between two feet 14 of the person 4 are extracted by the image recognition unit 68, and the resulting data are outputted to the transportation state database 21 to be recorded therein, and the data of the elbow position 12, the hand position 13 and the shoulder position 18 are also outputted to the transportation state detecting unit 67 (from step S20 to step S26).

Next, the transportation state detecting unit 67 estimates an elbow joint angle 11 and a grabbing hand from the elbow position 12, the hand position 13 and the shoulder position 18 obtained by the result of the image recognition in the image recognition unit 68, and outputs the resulting data to the transportation state database 21 (step S21, step S26).

Next, the center-of-gravity measuring unit 69 measures the center-of-gravity coordinates 19 of the person who is operating the robot arm 5, and outputs the resulting data to the transportation state database 21 (step S22, step S26).

Next, the heart rate, the blood pressure and the body temperature of the person 4 who is operating the robot arm 5 are measured by the body condition measuring unit 70, and the resulting data are outputted to the transportation state database 21 together with the measuring date and time. Moreover, the degree of vibration corresponding to the degree as to whether or not the hand of the person 4 is trembling is estimated, and the resulting data are outputted to the transportation state database 21 (step S23, step S26).

Next, the weight of the object 3 is estimated by the object weight estimating unit 65, and the resulting data are outputted to the transportation state database 21 (step S24, step S26).

Next, the person 4 inputs attribute data (attribute information) by using the data input IF 66 such as an input device like a keyboard, a mouse or a microphone, and the resulting data are outputted to the transportation state database 21 (step S25, step S26).

As a post-treatment of the operation steps, the degree-of-danger calculating unit 22 calculates the degree of danger based on pieces of information on working states, such as the posture of the person 4 or the body conditions thereof, recorded in the transportation state database 21 (step S27).

Next, the impedance setting unit 23 calculates impedance parameters by using the expressions (3) to (5) based on at least one or more pieces of information, such as the degree of danger of the person 4, the weight of the object 3, the dimension of the object 3, the hardness of the object 3, the degree of sharpness of the object 3 and the degree of importance of the object 3, and outputs the resulting data to the impedance control unit 24 (step S27).

With respect to step S20, step S22, step S23 and step S24, no special order is required. Moreover, since, upon starting the object transporting process or completing the object transporting process, the posture of the person 4 tends to change drastically to often cause a dangerous situation, the frequency (at a rate of once every several seconds) of the processes of step S20, step S22, step S23 and step S24) may be made higher, while, upon a parallel moving process horizontally, the frequency of the processes may be made lower. With this arrangement, the changes in the posture upon starting the object transporting process, as well as upon completing the object transporting process, can be detected with high precision. For example, in an attempt to control the frequency of the processes to a high level by detecting the start of the transporting process and the completion of the transporting process, for example, upon receipt of an input indicating the start of the transporting process or the completion of the transporting process by the data input IF 66, instructions may be respectively given to the image recognition unit 68, the transportation state detecting unit 67, the center-of-gravity measuring unit 69, the body condition measuring unit 70 and the object weight estimating unit 65 so as to increase the frequency of the processes.

Figure 5:
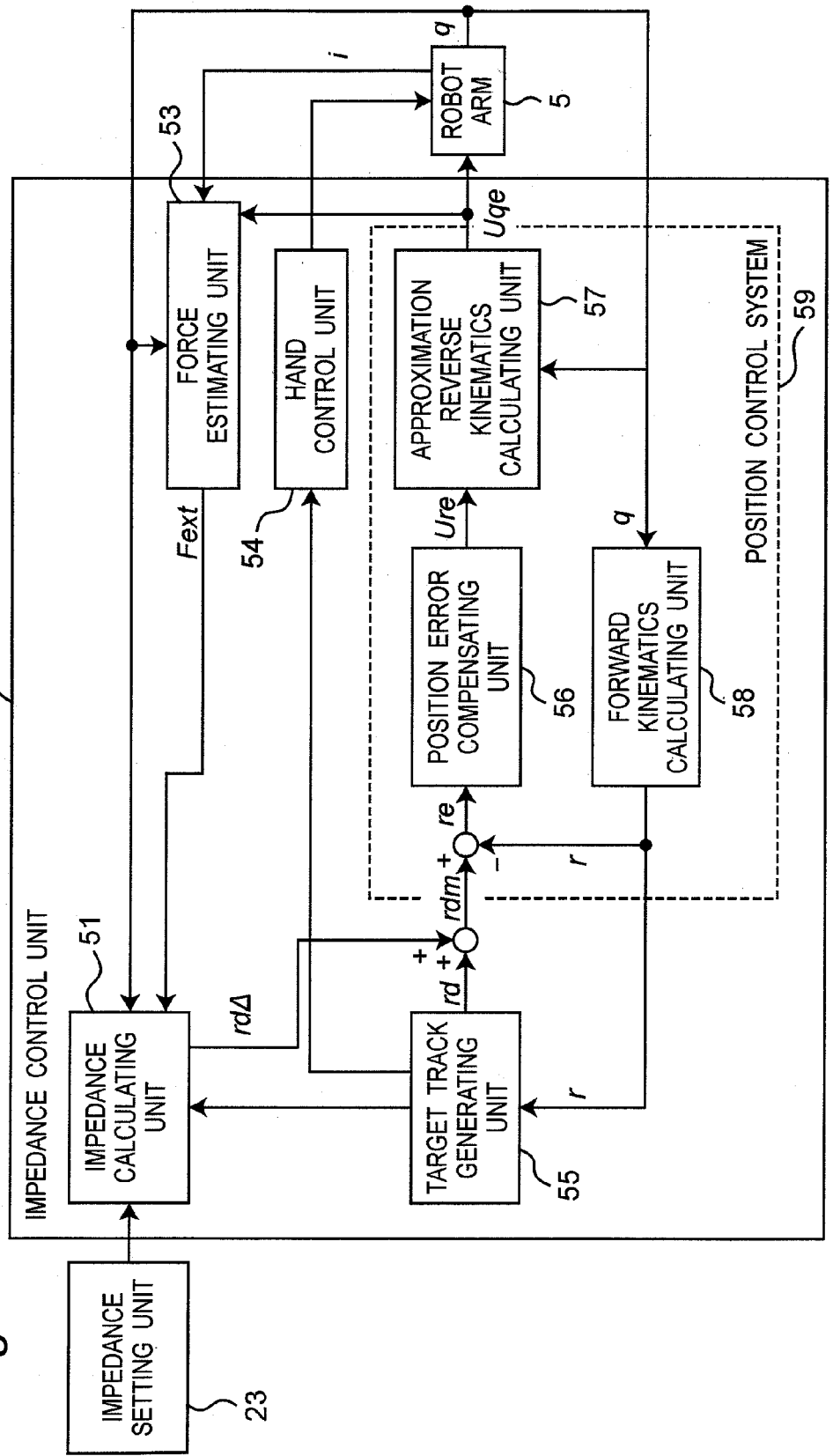
FIG. 5 is a block diagram showing a structure of an impedance control unit of the control device in accordance with the first embodiment of the present invention.

FIG. 5 is a block diagram showing the impedance control unit 24. The impedance control unit 24 controls the mechanical impedance values of the robot arm 5 to the mechanical impedance set values of the robot arm 5 that have been set based on set values of the inertia M, viscosity D and rigidity K determined by the impedance setting unit 23.

Next, referring to FIG. 5, the following description will discuss the impedance control unit 24 in detail. From the robot arm 5, current values of the joint angle, that is, vectors (joint angle vectors) $q=[q_1, q_2, q_3, q_4, q_5, q_6]^T$, measured by each of the encoders 44 of the respective joint axes, is outputted, and taken into the impedance control unit 24 by the counter board of the input/output IF 26. In this case, $q_1, q_2, q_3, q_4, q_5$ and $q_6$ respectively correspond to joint angles of the first joint portion 35, the second joint portion 36, the third joint portion 37, the fourth joint portion 38, the fifth joint portion 39 and the sixth joint portion 40.

Reference numeral 55 represents a target track generating unit that outputs the hand position and posture target vectors $r_d$ and open/close information h of the hand 30 that are used for realizing the target operations of the robot arm 5. With respect to the target operations of the robot arm 5, positions ($r_{d0}$, $r_{d1}$, $r_{d2}$, ...) at respective points at respective points of time (t=0, t=$t_1$, t=$t_2$, ...) and open/close information ($h_0$, $h_1$, $h_2$, ...) are preliminarily given in accordance with the target jobs, and the target track generating unit 55 interpolates the track between the respective points by polynomial interpolation, and generates hand position and posture target vectors rd. The open/close information h of the hand 30 is a numeric value of "1" or "0", and the open state of the hand 30 is indicated by "1" and the closed state of the hand 30 is indicated by "0", and these are sent to the hand control unit 54, which will be described later.

Reference numeral 54 represents the hand control unit, which, upon receipt of open/close information on the hand 30 from the target track generating unit 55, controls the driving operation of the rotation of the motor 62 through a motor driver 27 so that, by forward/reverse rotating the rotation shaft of the motor 62 for driving the hand, the hand 30 is opened and closed.

Reference numeral 53 represents a force estimating unit that estimates an external force to be applied to the robot arm 5 by a contact between a person or the like and the robot arm 5. Current values $i=[i_1, i_2, i_3, i_4, i_5, i_6]^T$ which flow through motors 43 for driving the respective joint portions of the robot arm 5, and are measured by a current sensor of the motor driver 27, are taken into the force estimating unit 53 through the A/D board of the input/output IF 26, and the current value q of each joint angle is taken into the force estimating unit 53 through the counter board of the input/output IF 26, with a joint angle error compensating output $U_{qe}$ from an approximation reverse kinematics calculating unit 57, which will be described later, being also taken into the force estimating unit 53. The force estimating unit 53 functions as an observer, and calculates a torque $\tau_{ext}=[\tau_{1ext}, \tau_{2ext}, \tau_{3ext}, \tau_{4ext}, \tau_{5ext}, \tau_{6ext}]^T$ generated in each joint portion by the external force to be applied to the robot arm 5, from the above-mentioned electric current value i, the current value q of the joint angle and the joint angle error compensating output $U_{qe}$. Moreover, the torque is converted by $F_{ext}=J_v(q)^{-T}\tau_{ext}-[0, 0, mg]^T$ into an equivalent hand external force $F_{ext}$ in the hand of the robot arm 5 so as to output the resulting value. In this case, $J_v(q)$ corresponds to a Jacobi matrix that satisfies the following equation.

[Equation 6]

$$v=J_v(q)\dot{q}$$

In this case, $v=[v_x, v_y, v_z, \omega_x, \omega_y, \omega_z]^T$, and ($v_x, v_y, v_z$) represent translation velocities of the hand of the robot arm 5 in the hand coordinate system 42, while ($\omega_x, \omega_y, \omega_z$) are angular velocities of the hand of the robot arm 5 in the hand coordinate system 42. Moreover, m represents the weight of the object 3, and g is the gravitational acceleration of the grabbed object 3. The value of the weight m of the grabbed object 3 may be inputted by the person 4 through the data input IF 66 before the object is grabbed, or may be obtained from the transportation state database 21 through the impedance setting unit 23. Moreover, the object 3 to be grabbed is actually grabbed by the robot arm 5, and based on the result of estimation from the equivalent hand external force $F_{ext}$ of the force estimating unit 53 at this time, the value of the weight m of the grabbed object 3 may also be calculated.

The impedance calculating unit 51 is a unit used for allowing the robot arm 5 to achieve control of the mechanical impedance value of the robot arm to a mechanical impedance set value, and based on the inertia M, viscosity D and rigidity K that are impedance parameters set by the impedance setting unit 23, the current value q of the joint angle and the external force $F_{ext}$ estimated by the force estimating unit 53, it calculates a hand position and posture target compensating output $r_{dΔ}$ for use in allowing the robot arm 5 to achieve control of the mechanical impedance value of the robot arm 5 to the mechanical impedance set value from the following expression (6), and outputs the corresponding value. The hand position and posture target compensating output $r_{dΔ}$ is added to the hand position and posture target vectors $r_d$ outputted by the target track generating unit 55 so that hand position and posture compensating target vectors $r_{dm}$ are generated.

[Equation 7]

$$r_{dΔ} = (s^2\hat{M} + s\hat{D} + \hat{K})^{-1} F_{ext} \quad \text{Expression (6)}$$

In this case, the following matrixes are satisfied, and s represents a Laplace operator.

[Equation 8]

$$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad \text{Expression (7)}$$

[Equation 9]

$$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad \text{Expression (8)}$$

[Equation 10]

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \quad \text{Expression (9)}$$

Reference numeral 58 represents a forward kinematics calculating unit to which the joint angle vectors q corresponding to the current value q of the joint angle measured by the encoder 44 of each joint axis of the robot arm 5 are inputted through the counter board of the input/output IF 26, and this unit carries out geometric calculations on conversion from the joint angle vectors q of the robot arm 5 to the hand position and posture vectors r.

Reference numeral 56 represents a positional error compensating unit to which an error $r_e$ between the hand position and posture vectors r calculated by the forward kinematics calculating unit 58 from the joint angle vectors q measured in the robot arm 5 and the hand position and posture compensating target vectors $r_{dm}$ is inputted and from which a positional error compensating output $u_{re}$ is sent toward an approximation reverse kinematics calculating unit 57.

In the approximation reverse kinematics calculating unit 57, reverse kinematical approximation calculations are executed by approximation expression $u_{out} = J_r(q)^{-1} u_{in}$. In this case, $J_r(q)$ is a Jacobi matrix that satisfies the following relationship, $u_{in}$ is an input to the approximation reverse kinematics calculating unit 57, and $u_{out}$ is an output from the approximation reverse kinematics calculating unit 57, and supposing that the input $u_{in}$ is equivalent to the joint angle error $q_e$, a conversion expression, $q_e = J_r(q)^{-1} r_e$, from the hand position and posture error $r_e$ to joint angle error $q_e$ is obtained. Therefore, when the positional error compensating output $u_{re}$ is inputted to the approximation reverse kinematics calculating unit 57, a joint angle error compensating output $u_{qe}$ for use in compensating for the joint angle error $q_e$ is sent from the approximation reverse kinematics calculating unit 57 as an output thereof.

[Equation 11]

$$\dot{r} = J_r(q)\dot{q}$$

The joint angle error compensating output $u_{qe}$ is given to the motor driver 27 as a voltage instruction value through the D/A board of the input/output IF 26, and the respective joint axes are consequently driven to forwardly or reversely rotate by the respective motors 43 so that the robot arm 5 is operated.

With respect to the impedance control unit 24 configured as described above, the following description will discuss the principle of the impedance controlling operation of the robot arm 5.

The impedance controlling operation basically corresponds to a feedback controlling operation (positional control) of the hand position and posture error $r_e$ by the positional error compensating unit 56, and a portion surrounded by a dotted line in FIG. 5 forms a positional control system 59. By using, for example, a PID compensator as the positional error compensating unit 56, the controlling process is carried out so as to allow the hand position and posture error $r_e$ to converge to 0 so that the target impedance controlling operation of the robot arm 5 can be achieved.

Figure 6:
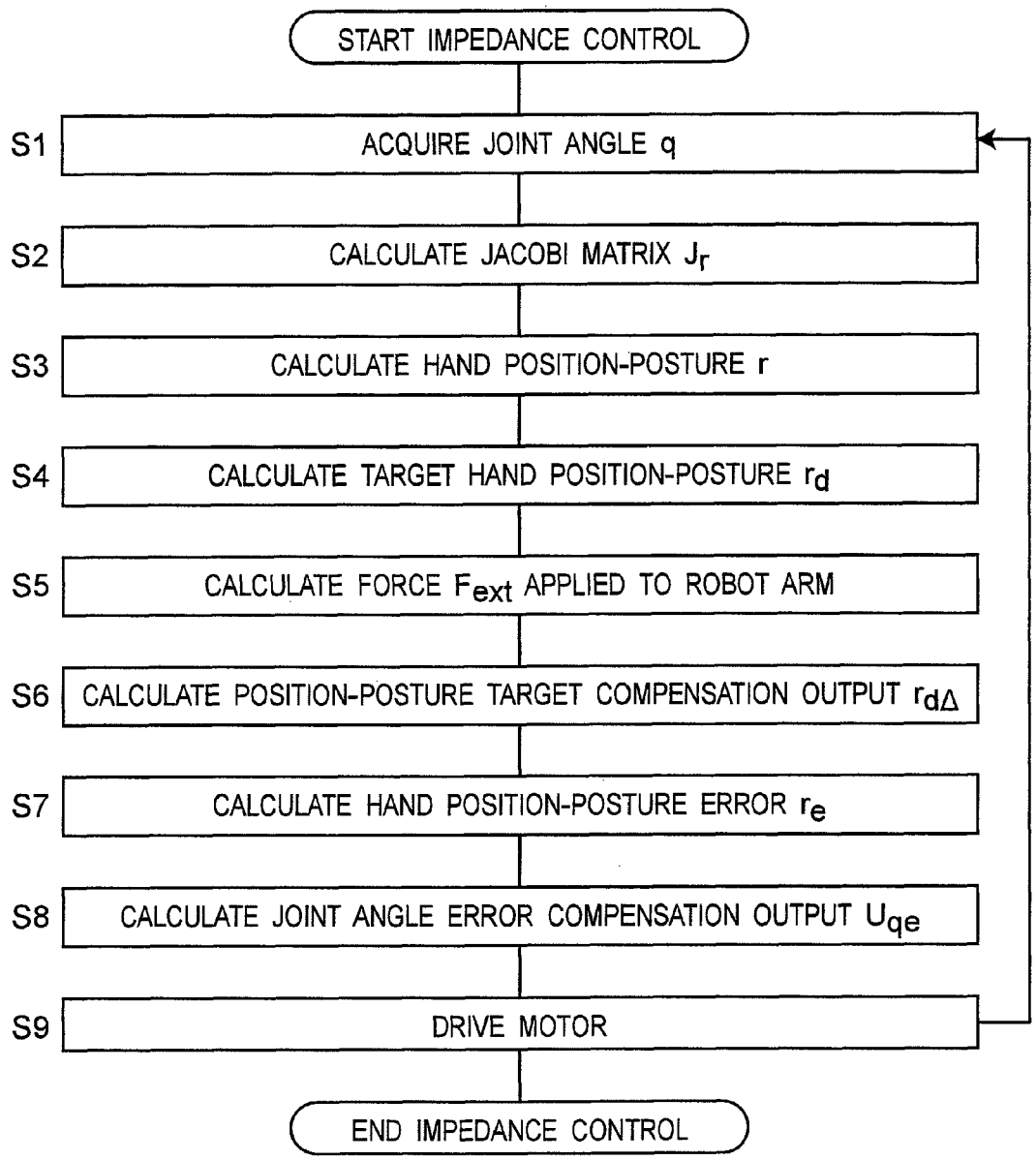
FIG. 6 is a flow chart showing operation steps of the impedance control unit of the control device in accordance with the first embodiment of the present invention.

Referring to a flow chart in FIG. 6, the following description will discuss actual operation steps of a controlling program based on the above-mentioned principle. The controlling program can be executed by a computer.

First, the joint angle data (joint variable vectors or joint angle vectors q), measured by the encoder 44 of each joint portion, are taken into the control device 2 (step S1).

Next, calculations are carried out on the Jacobi matrix $J_r$ or the like required for kinematical calculations of the robot arm 5 in the approximation reverse kinematics calculating unit 57 (step S2).

Next, in the forward kinematics calculating unit 58, the current hand position and posture vectors r of the robot arm 5 are calculated from the joint angle data (joint angle vectors q) from the robot arm 5 (step S3).

Next, based on the operation program of the robot arm 5 preliminarily stored in a memory (not shown) in the control device 2, the target track calculating unit 55 calculates the hand position and posture target vectors $r_d$ of the robot arm 5 (step S4).

Next, the force estimating unit 53 calculates an equivalent hand external force $F_{ext}$ in the hand of the robot arm 5 based on the driving current value i of the motor 43, the joint angle data (joint angle vectors q) and the joint angle error compensating output $u_{qe}$ (step S5).

In the impedance calculating unit 51, based on the inertia M, viscosity D and rigidity K that are impedance parameters set by the impedance setting unit 23, the joint angle data (current angle vectors q) and the equivalent hand external force $F_{ext}$ calculated by the force estimating unit 53 and applied to the robot arm 5, a hand position and posture target compensating output $r_{d\Delta}$ is calculated (step S6). Thereafter, the sequence proceeds to step S7.

Next, in the positional error compensating unit 56, hand position and posture compensating target vectors $r_{dm}$ that are sums of the hand position and posture target vectors $r_d$ and the hand position and posture target compensating output $r_{d\Delta}$ and the error $r_e$ of the hand position and posture that is a difference between the current hand position and the posture vectors r are calculated (step S7). A specific example of the positional error compensating unit 56 includes a PID compensator. By appropriately adjusting the three gains of proportion, differentiation and integration that are diagonal matrixes of a constant, the positional error is controlled to be converged to 0.

Next, in the approximation reverse kinematics calculating unit 57, by multiplying the reverse matrix of the Jacobi matrix Jr calculated in step S2 in the approximation reverse kinematics calculating unit 57, the positional error compensating output $u_{re}$ is converted from the value relating to the error of the hand position and posture to the joint angle error compensating output $u_{qe}$ relating to the error of the joint angle by the approximation reverse kinematics calculating unit 57 (step S8).

Next, the joint angle error compensating output $u_{qe}$ is given to the motor driver 27 from the approximation reverse kinematics calculating unit 57 through the D/A board of the input/output IF 26, and by changing the amount of current flowing through each of the motors 43, rotation movements of the respective joint axes of the robot arm 5 are generated (step S9).

By executing the above-mentioned steps S1 to S9 repeatedly as the calculation loop of control, the operations of the robot arm 5 are controlled, that is, the controlling operations for controlling the values of the mechanical impedance of the robot arm 5 to the set values that are appropriately set can be achieved.

Figures 14, 15:
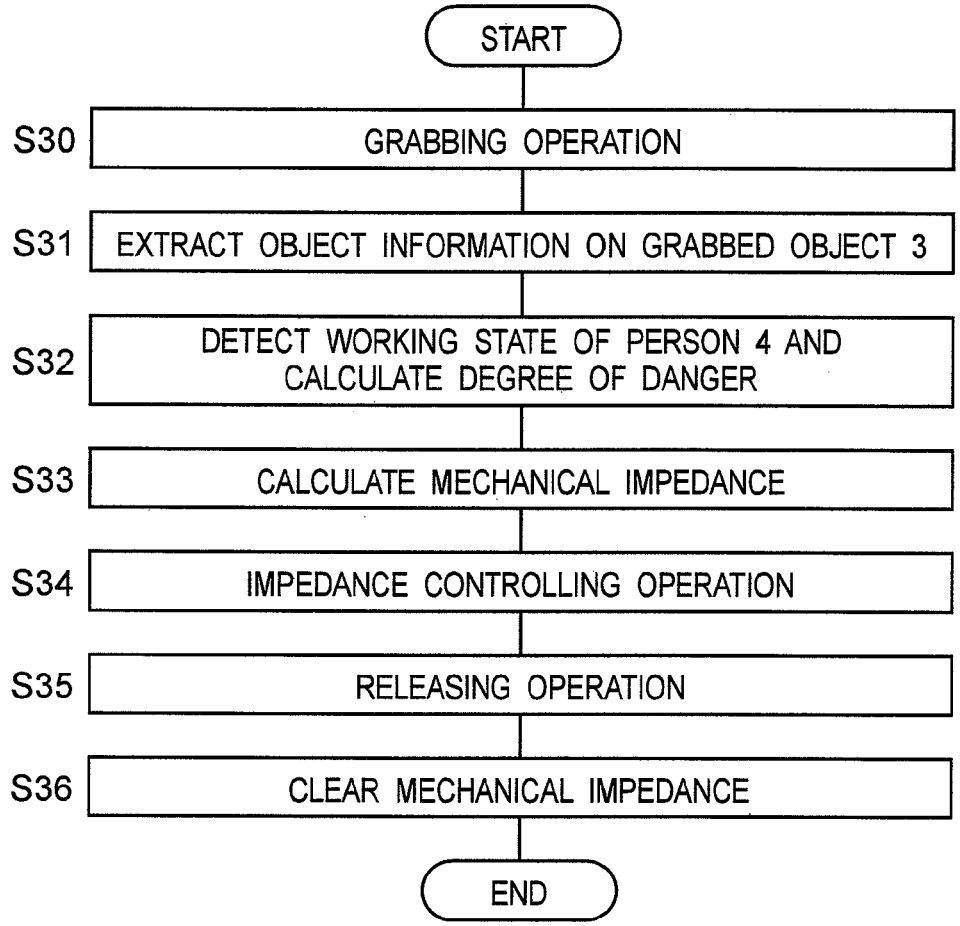
FIG. 14 is a flow chart showing the entire operation steps of the control device in accordance with the first embodiment of the present invention.
FIG. 15 is a table describing a grabbing rule list of a transportation state database of a control device in accordance with a second embodiment of the present invention.

Next, with respect to the entire operations of the control device 2 in the first embodiment of the present invention, referring to a flow chart of FIG. 14 shown as one specific example, the following description will discuss transporting jobs in which, after the control device 2 has received an instruction for starting an object transportation from a person 4 through the data input IF 66 such as a button, the person 4 transports an object 4 while grabbing the object 4 by operating the robot arm 5.

First, in step 30, the target track generating unit 55 generates a target track used for grabbing an object 3 by a hand 30 of the robot arm 5, and the hand position and posture of the robot arm 5 are controlled by the controlling flow that passes step S8 shown in FIG. 6, and the hand driving motor 43 is drive-controlled by the control device 2 so that the hand 30 in its open state is made close to the object 3, with the hand 30 being located at a position from which the object 3 can be grabbed, and by closing the hand 30 so as to grab the object 3, a grabbing operation of the object 3 can be achieved. Additionally, the positional information on the object 3 to be grabbed that is required when the target track is generated may be preliminarily stored in an environment map database, not shown, or may be obtained by utilizing the image-pickup device 28 and the image recognition unit 68. With this arrangement, in the case of a fixed robot arm 5, based on information on the fixed position of the robot arm and the positional information on the object 3 to be grabbed, the target track used for grabbing the object 3 can be generated by the target track generating unit 55. Moreover, in a case where the robot arm 5 is moved by a moving device 5A having a structure in which, for example, a movable portion of a rail 8 having a secured base portion 34 is allowed to move relative to the secured portion, or the movable portion is allowed to travel along a fixed rail by a wheel attached to the base portion 34, the current positional information on the robot arm 5 relative to a reference position is preliminarily acquired by utilizing, for example, the image-pickup device 28 and the image recognition unit 68 so that based on the acquired current positional information and the positional information on the object 3 to be grabbed, the target track for use in grabbing the object 3 can be generated by the target track generating unit 55. Additionally, the positional information on the object 3 can also be extracted by attaching an RF tag or the like to the object. With respect to the moving control upon moving the robot arm 5 by using the moving device 5A, as described earlier, the hand coordinates r of the robot arm 5 are indicated by vectors in the hand coordinate system 42 viewed from the absolute coordinate system 41. For example, in a case where the rail 8 to which the robot arm 5 is moved as the moving device 5A, as the rail 8 is moved, the coordinates of the absolute coordinate system 41 are parallel shifted. However, the hand position, which is a relative position from the absolute coordinate system 41, has no change even when the rail 8 is moved.

The environment map database is formed by storing a map of layout information, such as walls and pieces of furniture, that depends on the peripheral environment of the robot arm 5, and this is used, for example, when the presence or absence of an obstacle or the like upon transporting an object by using the robot arm 5 is preliminarily acquired and an avoiding operation for allowing the robot arm 5 to move while avoiding the obstacle is carried out.

Next, in step S31, the information on RF tag 46 attached to the object 3 is read by the RF tag receiving unit 45 attached to the hand 30 so that ID information, such as ID number of the object 3, is identified by the RF tag receiving unit 45.

Next, the ID information, such as ID number, read by the RF tag receiving unit 45 is inputted to the transportation state database 21 through the transportation state information collecting unit 25, and based on the inputted ID information, the characteristic data, such as the weight and the dimension of the object 3, are read in the transportation state database 21 so that the characteristic data, thus read, are transferred from the transportation state database 21 to the impedance setting unit 23.

Next, in the step S21, the body characteristic information, posture information and body condition information on the person 4 who is operating the robot arm are detected and measured by the transportation state information collecting unit 25, and the resulting data are outputted to the transportation state database 21 together with the ID number by which the person 4 is identified. Moreover, by using a degree of danger calculating flow in step S27, the degree-of-danger calculating unit 22 calculates the degree of danger, and the resulting data are stored in the transportation state database 21, and also transferred to the impedance setting unit 23. By attaching an RF tag to the person 4, the identification of the person 4 may be confirmed by extracting the identification number in the RF tag receiving unit 45, or prior to the job, the person 4 may input the ID number to the data input IF 66.

Next, in step S33, based on the object information and the degree of danger transferred from the transportation state database 21, the mechanical impedance set values are calculated from the aforementioned expressions (3) to (5) in the impedance setting unit 23.

In step S34, impedance controlling operations (operations in the impedance control unit 24) for controlling the values of the mechanical impedance of the robot arm 5 so as to be set to the mechanical impedance set values calculated in the impedance setting unit 23 are carried out by the impedance control unit 23 so that the impedance controlling operations are continued while the person 4 is operating the robot arm 5.

In step S35, upon receipt of a transportation completion signal by the data input IF 66 formed by buttons or the like after the completion of the transportation of the object 3, the hand 30 of the robot arm 5 is opened by the control of the control device 2 so that the object 3 is released from its grabbed state.

Next, in step S36, upon receipt of an operation completion informing signal by the data input IF 66 formed by buttons or the like, the input from the buttons is inputted to the impedance control unit 24 through the transportation state database 21, the degree-of-danger calculating unit 22 and the impedance setting unit 23, and the operation completion informing signal is outputted from the target track generating unit 55 of the impedance control unit 24 to the impedance calculating unit 51 so that the preset mechanical impedance set values are cleared by the impedance calculating unit 51.

In the above-mentioned operation steps S30 to S36, the impedance parameters are set in the impedance setting unit 23 based on the working posture or body conditions of the person 4 and the characteristics of the object 3, and the impedance control unit 24 carries out controlling operations so that, in accordance with the parameters, a transporting operation of the object 3 by the robot arm 5 is realized.

As described above, the transportation state information collecting unit 25, the transportation state database 21, the impedance setting unit 23, the degree-of-danger calculating unit 22 and the impedance control unit 24 are prepared so that, upon operating the robot arm 5 by the person 4, in accordance with the pieces of information on posture or body conditions of the person 4 and the characteristics of the object collected by the transportation state information collecting unit 25, the robot arm 5 is swiftly shifted from an impedance controlling state with high rigidity to an impedance controlling state with low rigidity so as to ensure safety. In other words, the robot arm 5 is shifted to a state capable of exerting sufficient flexibility so that, even in a dangerous state, safety is ensured by allowing the robot arm 5 to move flexibly. More specifically, as shown in FIG. 10 or 11, in a case where the object 3 is being transported in a bad state in the posture of the person 4, or in a state in which the blood pressure or the heart rate is higher than that in the normal state, or in a state in which the hand of the person 4 is trembling, there is a danger of falling down of the person 4 or a misoperation by the person 4. Moreover, even in a case where the object 3 is being transported in a good state in the posture of the person 4, or in a state with normal blood pressure and heart rate, or in a state in which no trembling of the hand is observed, if the state is changed to a state, as shown in FIG. 10 or 11, where the object 3 is being transported in a bad state in the posture of the person 4, or in a state in which the blood pressure or the heart rate is higher than that in the normal state, or in a state in which the hand of the person 4 is trembling, there is a danger of falling down of the person 4 or a misoperation by the person 4 in the same manner. In this case, or at this time, the information on the corresponding state is collected by the transportation state information collecting unit 25, and based on the collected information and information stored in the transportation state database 21, the degree of danger is set to "level 5" by the degree-of-danger calculating unit 22, and the rigidity K is consequently set to a high level by the impedance setting unit 23 so that the mechanical impedance set value of the robot arm 5 is in proportion to the degree of danger "level 5"; thus, the posture of the hand of the robot arm 5 is controlled to be properly maintained so that, even if the person 4 falls down or makes a misoperation, the grabbed object 3 can be transported safely. Moreover, in a case where, from the above-mentioned state, the posture of the person 4 becomes a better state, or the blood pressure or the heart rate becomes a normal state, or the hand of the person 4 is recovered to a state with not so much trembling, so that the object 3 can be transported properly, the information on the corresponding state is collected by the transportation state information collecting unit 25, and based on the collected information and the information stored in the transportation state database 21, the degree of danger is set from "level 5" to "level 4" or a level lower than this, by the degree-of-danger calculating unit 22, and the rigidity K is consequently set to a low level by the impedance setting unit 23 so that the mechanical impedance set value of the robot arm 5 is in proportion to the degree of danger "level 4" or a level lower than this; thus, the robot arm can be operated more flexibly.

Based on the information collected in the transportation state information collecting unit 25 and information stored in the transportation state database 21, by taking into consideration the object information on the object 3 in addition to the posture and body condition information on the person 4, it is possible to carry out an impedance control in accordance with the object characteristic of the grabbed object 3. For example, in a case where the object 3 is light, since it is not so dangerous even in a bad posture, the degree-of-danger calculating unit 22 sets the degree of danger to a low level, and the impedance setting unit 23 uses expression (5) so that the mechanical impedance set value of the robot arm 5 is set to a low value so as to deal with a low degree of danger; thus, the spring property of the robot aim 5 becomes weaker to make the resistance smaller so that the robot arm 5 can be flexibly operated even in a bad posture of the person 4. In contrast, in a case where a heavy object 3 is being transported, the degree-of-danger calculating unit 22 sets the degree of danger to a high level, and the impedance setting unit 23 uses expression (5) as well as FIGS. 21A and 21B so that the mechanical impedance set value of the robot arm 5 is set to a high value so as to deal with a high degree of danger; thus, the spring property of the robot arm 5 becomes stronger to make the resistance greater so that it becomes possible to prevent the robot arm 5 from being moved beyond the required level, and consequently to reduce the danger caused by a falling object 3. FIG. 21A is a table showing an example, in a table format, to be used for calculating the degree of danger so as to be a low level in a case where the weight of an object 3 is light, and FIG. 21B is a table showing an example, in a table format, to be used for calculating the degree of danger so as to be a high level in a case where the weight of an object 3 is heavy.

As described above, in accordance with the control device 2 relating to the first embodiment of the present invention, in response to a state in which the posture or body condition of the person 4 is bad, or to a characteristic of the object 3, the robot arm 5 is appropriately controlled so that it is possible to provide a control device that achieves a safe robot control, without causing the object 3 to fall down or making it in contact with another person or another object to impose a burden onto the person.

Second Embodiment

The basic structure of a control device 2A of a robot arm in accordance with a second embodiment of the present invention is the same as that of the first embodiment; therefore, the description of those common portions will be omitted, and the following description will mainly discuss different portions in detail.

FIG. 15 is a table describing a grabbing rule list of transportation state database 21. The transportation state database 21 may be provided, in addition to the object information on the object 3 in FIG. 8 or the information indicating the posture, body condition and the like of the person 4 in FIG. 9, with a grabbing rule list 71 shown in FIG. 15 in which constraint condition information on the position and the posture of the object 3 is described. The grabbing rule list 71 includes items, such as position maintenance, posture maintenance and height maintenance, and a numeric value of 1 or 0 is preliminarily recorded to each of the items. For example, the grabbing rule in the first line of FIG. 15 is given as 0 in position maintenance, 1 in posture maintenance and 0 in height maintenance. The grabbing rule in the second line of FIG. 15 is given as 1 in position maintenance, 1 in posture maintenance, and 0 in height maintenance. The grabbing rule in the third line of FIG. 15 is given as 0 in position maintenance, 1 in posture maintenance and 1 in height maintenance.

Figure 20:
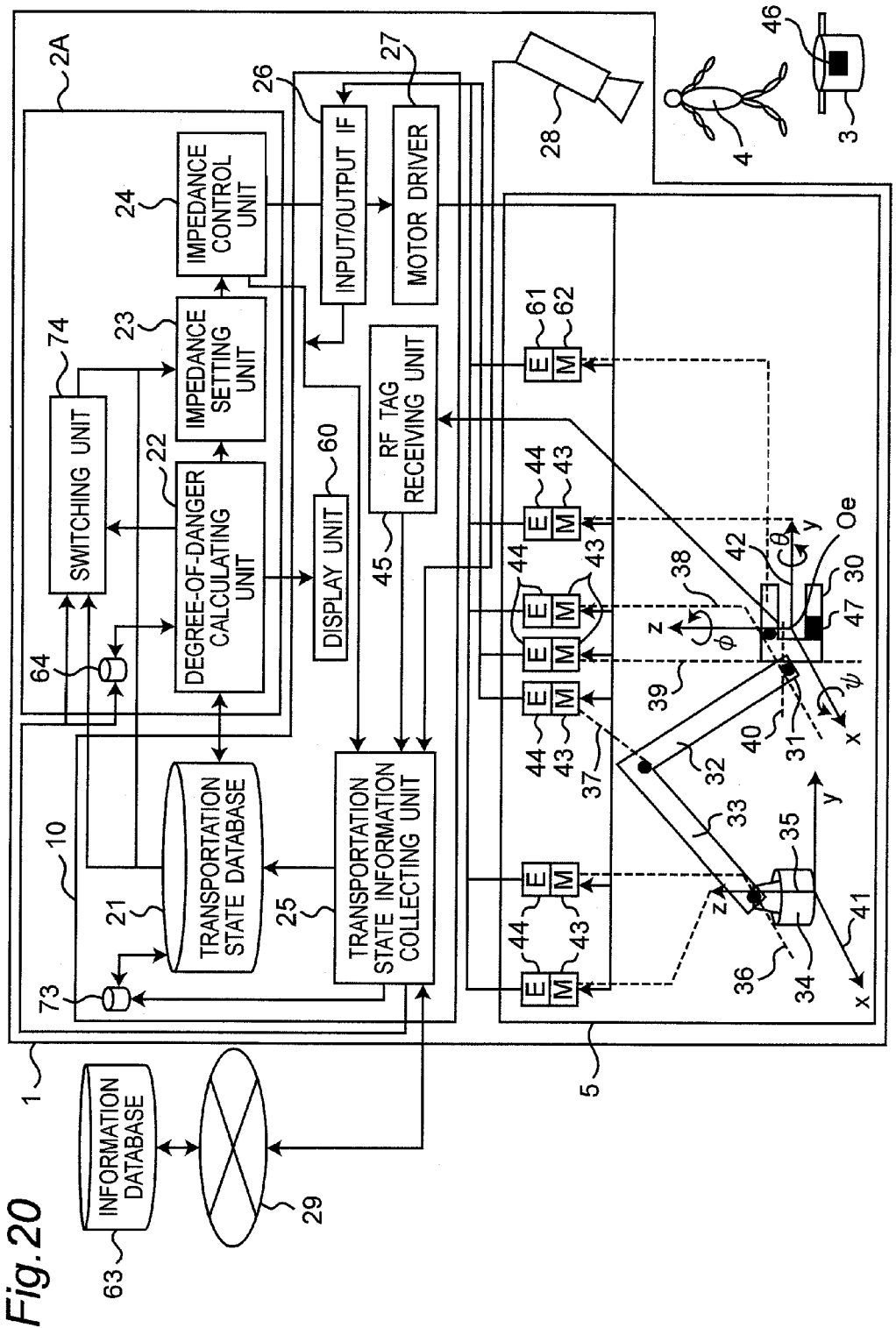
FIG. 20 is a view showing a specific structure of the control device that forms a robot system, and a robot arm as a subject to be controlled, in accordance with the second embodiment of the present invention.

FIG. 20 is a view showing a specific structure of a control device 2A and a robot arm 5 to be controlled, which form a robot system 1 provided with the control device 2A for the robot arm in accordance with the second embodiment.

A switching unit 74 is placed between the transportation state database 21 and the impedance setting unit 23, and switches the rules based on the grabbing rule list 71. More specifically, in the case of the item of posture maintenance is 1, the grabbing rule list 71 shows that there is information on a constraint condition that the posture of the object 3 should be fixed without movements, and the switching unit 74 gives an instruction to the impedance setting unit 23 so that the mechanical impedance set values in rotation directions (φ, θ, ψ) in the hand position of the hand 30 of the robot arm 5 are set to great values by the impedance setting unit 23 so as to be controlled such that the hand position, that is, the posture of the hand 30, is hardly varied.

For example, as shown in FIG. 10, in a case where the person 4 is operating the robot arm 5 in a bad posture, since there is a danger of a misoperation due to falling down of the person 4 or the like, the item of the posture maintenance of the grabbing rule table 71 is set to 1 so as to maintain the object 3 horizontally, with the posture of the hand 30, that is, the hand position, being properly maintained.

The setting of the items in the grabbing rule table 71 is carried out by the switching unit 74 based on the detection results of the transportation state detecting unit 67 or the degree-of-danger calculating unit 22. For example, in a case where the person 4 is transporting the object 3 in a bad posture of the person 4, if the degree-of-danger is calculated as "level 5" by the degree-of-danger calculating unit 22 so as to prevent the contents of the object 3 from falling down, the item of posture maintenance of the grabbing rule list 71 of the switching unit 74 is set to 1 by the switching unit 74 based on the information from the degree-of-danger calculating unit 22.

Moreover, in a case where the item of position maintenance is set to 1 (in the case of the grabbing rule in the second line of FIG. 15), the switching unit 74 gives an instruction to the impedance setting unit 23 so that the mechanical impedance set values in translation directions (x, y, z) in the hand 30, that is, the hand position, of the robot arm 5 are set to great values by the impedance setting unit 23 so as to be controlled such that the posture of the hand 30, that is, the hand position, is hardly varied. For example, in a state where the body condition of the person 4 is worse than normal condition so that the degree-of-danger is set to a high level by the degree-of-danger calculating unit 22 since the danger of a misoperation is high in the robot arm 5, the item of position maintenance of the grabbing rule list 71 of the switching unit 74 is set to 1 by the switching unit 74 based on the information from the degree-of-danger calculating unit 22.

Furthermore, in a case where the item of height maintenance is set to 1 (in the case of the grabbing rule in the third line of FIG. 15), the mechanical impedance set value in the z-direction of the hand 30, that is, the hand position, of the robot arm 5 is set to a great value by the impedance setting unit 23 so that the height of the hand position of the hand 30 is maintained in a high level.

For example, as shown in FIG. 11, based on the information collected by the transportation state information collecting unit 25, it is determined by the switching unit 74 that, based on information calculated from a difference between the height of the upper edge of the sternum and the hand position, the person 4 is operating the robot arm 5 at a position higher than the chest so as to avoid an obstacle 72 near the feet, the item of the height maintenance is set to 1 by the switching unit so as to avoid the possibility that the person 4 erroneously operates, with the hand position of the person 4 being lowered, to come into contact with the obstacle 72 near the feet. In other words, the pieces of information on the height of the sternum upper edge and the hand position are collected by the transportation state information collecting unit 25, and the resulting data are stored in the transportation state database 21, while, in a case where, by inputting the pieces of information on the height of the sternum upper edge and the hand position thereto, the switching unit 74 determines that the person 4 operates at a position higher than the chest, the item of the height maintenance is set to 1. In this case, the switching unit 74 gives an instruction to the impedance setting unit 23 so that the mechanical impedance set value in a downward perpendicular direction, that is, the −z direction, of the hand 30, that is, the hand position of the robot arm 5, is set to a great value by the impedance setting unit 23 so as to be controlled such that the position of the hand 30, that is, the hand position, is hardly lowered.

Next, the following description will discuss a method for controlling the mechanical impedance value of the robot arm 5 to a mechanical impedance set value, by exemplifying the case of posture maintenance (in the case of the grabbing rule in the third line of FIG. 15), The hand position and posture target compensating output $r_{d\Delta}$ is calculated by the following expression (10) in the impedance calculating unit 51 of the impedance control unit 24.

[Equation 12]

$$r_{d\Delta}=a(s^2\hat{M}+s\hat{D}+\hat{K})^{-1}F_{ext} \quad \text{Expression (10)}$$

In this case, the following matrix is satisfied in which ($\alpha_x$, $\alpha_y$, $\alpha_z$, $\alpha_\phi$, $\alpha_\theta$, $\alpha_\psi$) are impedance controlling coefficients.

[Equation 13]

$$a = \begin{bmatrix} \alpha_x & 0 & 0 & 0 & 0 & 0 \\ 0 & \alpha_y & 0 & 0 & 0 & 0 \\ 0 & 0 & \alpha_z & 0 & 0 & 0 \\ 0 & 0 & 0 & \alpha_\phi & 0 & 0 \\ 0 & 0 & 0 & 0 & \alpha_\theta & 0 \\ 0 & 0 & 0 & 0 & 0 & \alpha_\varphi \end{bmatrix}$$

In a case where the person 4 is operating the robot arm 5, one component of the impedance control coefficients is altered by the impedance calculating unit 51.

For example, in a case where the person 4 is transporting an object 3 in a bad posture (in such a case where the degree-of-danger is calculated based on FIG. 19A or 19B so that the degree of danger is set to, for example, 4 or more, the switching unit 74 determines that the object 3 is being transported in a bad posture), if, with reference to the grabbing rule table 71 of the switching unit 74, the item for the posture maintenance in the grabbing rule table 71 is 1, the components ($\alpha_x$, $\alpha_y$, $\alpha_z$) corresponding to the position are switched to 1 by the impedance setting unit 23 so that the components ($\alpha_\phi$, $\alpha_\theta$, $\alpha_\psi$) corresponding to the posture are maintained at 0. With this arrangement, the position of the hand (x, y, z) is controlled by the impedance control unit 24 so as to be set to the rigidity K, and the posture ($\phi$, $\theta$, $\psi$) of the hand position is position-controlled and maintained by the impedance control unit 24. Therefore, for example, by making settings so that inertia M=0 and D=0 when the posture of the person 4 is bad, the mechanical impedance is determined by the impedance setting unit 23 to set values that can exert sufficient flexibility as the rigidity K, sufficient safety is exerted by allowing the position of the hand 30, that is, the hand position, to flexibly move, while, the posture of the hand 30, that is, the hand position, can be maintained; therefore, for example, in a case where a pan with water put therein is transported, even if the person 4 erroneously tilts the pan, the pan is maintained horizontally, making it possible to prevent water in the pan from falling down.

In this manner, the mechanical impedance value of the robot arm 5 is controlled to be determined to a mechanical impedance set value separately in each of the directions of the hand 30, that is, the hand position, so that it is possible to carry out controlling operations that can ensure safety of the object 3, as well as simultaneously ensuring safety of the person 4.

In the present embodiment 2, the grabbing rule list 71 is made as shown in FIG. 15; however, not limited to this, a format may be used in which the way of a switching operation of the mechanical impedance set value is specified in each of the position maintaining components, posture maintaining components and further ±directions, so that the same effects can be exerted, and the switching operations of the mechanical impedance set value may be specified in a further minute manner.

Third Embodiment

The basic structure of a robot-arm control device in accordance with a third embodiment of the present invention is the same as those of the first embodiment and second embodiment; therefore, the description of those common portions will be omitted, and the following description will mainly discuss different portions in detail.

Figure 4:
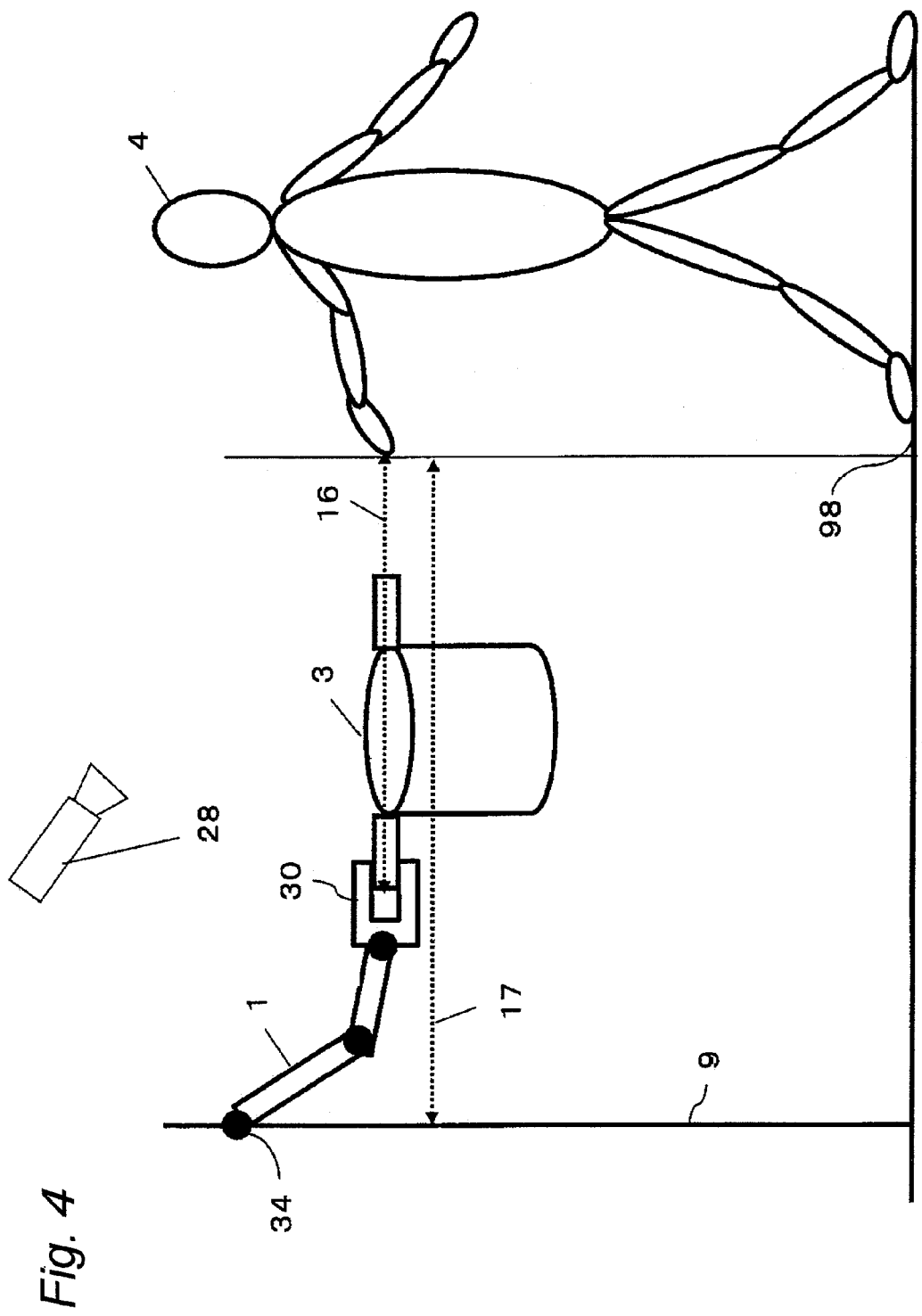
FIG. 4 is a view showing another operation state of the robot control device in accordance with the first embodiment of the present invention.

FIG. 4 is a view showing a relative positional relationship between a robot arm 5 and a person 4.

In FIG. 7, reference numeral 68 represents an image recognition unit that carries out an image recognition based on image data of an image pickup device 28 such as a camera, and by extracting the position of the base portion 34 of the robot arm 5, the position of the person 4 and the hand position of the robot arm 5 respectively, outputs the resulting data to the transportation state database 21. The degree-of-danger calculating unit 22 calculates a relative position 17 between the position of the person 4 and the position of the base portion 34 of the robot arm 5 from the corresponding positional information in the transportation state database 21 and a relative position 16 between the position of the person 4 and the hand position of the robot arm 5, and based on the relative positional relationships, calculates the degree of danger. More specifically, for example, in a case where the distance from the position of the base portion 34 of the robot arm 5 or the hand position of the robot arm 5 to the position of the person 4 is short, the corresponding degree is set to "level 5", while in a case where the positions between the robot arm 5 and the person 4 are far from each other, the corresponding degree is set to "level 1". Based on the expressions (3) to (5) in the same manner as in the first embodiment, the impedance parameters are calculated, and the resulting values are outputted to the impedance control unit 24. That is, by setting the rigidity K so as to be inversely proportional to the degree of danger by using the impedance setting unit 23, the rigidity is made lower in a case where the person 4 is approaching the robot arm 5 so that the robot arm 5 is operated flexibly to reduce the danger due to a collision against the person 4.

As described above, the mechanical impedance is properly set in accordance with the degree of proximity of the person to the robot arm 5 so that the danger upon collision of the person 4 with the robot arm 5 can be reduced, and it becomes possible to provide a control device that can achieve safe robot controlling operations.

In the control device of the robot arm of the first embodiment 1, by adjusting the gain of the positional error compensating unit 56, the value of the mechanical impedance of the robot arm 5 may be controlled to a mechanical impedance set value separately in a spurious manner in each of the directions of the hand position.

Moreover, in the first embodiment, the pieces of physical characteristic information are defined as weight information, dimension information and hardness information on the grabbed object; however, not limited to these, other physical characteristics, such as temperature or the like, may be used.

For example, provision may be made so that, in a case where a pan containing boiling water is transported with the pan being grabbed, the degree of danger is made higher, while, in a case where a pan containing water is transported with the pan being grabbed, the degree of danger is made lower. More specifically, for example, an infrared-ray sensor (not shown) is disposed near the hand of the robot arm 5, and by detecting the temperature of an object to be grabbed by the hand 30, that is, for example, the temperature of the pan itself or the liquid in the pan, by the infrared-ray sensor, the detected temperature is stored in the transportation state database 21 through the transportation state information collecting unit 25. In the degree-of-danger calculating unit 22, based on the temperature of the object (such as the temperature of the pan itself or the liquid in the pan) in the transportation database 21, the level of the degree of danger is calculated by the degree-of-danger calculating unit 22 in accordance with the relational information (see FIG. 22) between the temperature and the degree of danger, stored in the transportation state database 21 or possessed by the degree-of-danger calculating unit 22. That is, the calculating processes in the degree-of-danger calculating unit 22 are carried out such that, in a case where a pan containing boiling water is transported with the pan being grabbed, the level of the degree of danger is raised, while, in contrast, in a case where a pan containing water is transported with the pan being grabbed, the level of the degree of danger is lowered. Thereafter, in the impedance setting unit 23, the respective parameters of the mechanical impedance set values may be set by using the following expressions (3a) to (5a) in place of the aforementioned expressions (3) to (5).

[Equation 14]

$$M = KMa \times (\text{degree of danger}) + KMm \times (\text{weight [kg]}) + KMl \times (\text{dimension [m]}) + KMk \times (\text{hardness}) + KMt \times (\text{temperature}) + KMd \times (\text{degree of sharpness}) + KMp \times (\text{degree of importance}) \quad \text{Expression (3a)}$$

[Equation 15]

$$D = KDa \times (\text{degree of danger}) + KDm \times (\text{weight [kg]}) + KDl \times (\text{dimension [m]}) + KDk \times (\text{hardness}) + KDt \times (\text{temperature}) + KDd \times (\text{degree of sharpness}) KDp \times (\text{degree of importance}) \quad \text{Expression (4a)}$$

[Equation 16]

$$K = KKa \times (\text{degree of danger}) + KKm \times (\text{weight [kg]}) + KKl \times (\text{dimension [m]}) + KKk \times (\text{hardness}) + KKt \times (\text{temperature}) + KKd \times (\text{degree of sharpness}) + KKp \times (\text{degree of importance}) \quad \text{Expression (5a)}$$

In this case, KMt, KDt and KKt are gains, and correspond to certain constant values respectively.

In the first embodiment, the posture information is defined as the elbow joint angle 11 and the hand position of the person 4; however, not limited by these, the other pieces of posture information, such as the knee joint angle and the like, may be used. For example, since an object is normally transported by using the hand, the elbow joint angle is used as one piece of posture information; however, for example, in a case where an object is transported by using not the hand but a foot, the knee joint angle of the foot or the like may be used as the posture information. Alternatively, in a case where an object held on the shoulder is transported, an angle between the neck and the shoulder or the like may be used as the posture information.

Further, in the above-mentioned various embodiments, in a case where, based on the cooperative transportation information on the cooperative transportation information database 21, the degree of danger upon transporting an object by the person 4 is calculated by the degree-of-danger calculating unit 22, the pieces of cooperative transportation information (pieces of information, such as working posture information, body condition information, object characteristic information and information on the relative position between the robot arm 5 and the person 4) are indicated by numeric values, if the cooperative transportation information belongs to a dangerous region or abnormal region side in the cooperative transporting job relative to a predetermined degree-of-danger determining threshold value, the degree of danger may be calculated to a high value; in contrast, if the cooperative transportation information belongs to a non-dangerous region or normal region side in the cooperative transporting job relative to the threshold value, the degree of danger may be calculated to a low value.

Moreover, in the above-mentioned various embodiments, in a case where, based on at least one piece of information on the degree of danger calculated in the degree-of-danger calculating unit 22, or the physical characteristic information on the transportation state database 21 or the attribute information thereof, the impedance setting unit 23 sets the mechanical impedance set value of the robot arm 5, and in a case where the corresponding one piece of information is indicated by a numeric value, if the cooperative transportation information belongs to a dangerous region or abnormal region side in the cooperative transporting job relative to a predetermined degree-of-danger determining threshold value, the degree of danger may be calculated to a high value; in contrast, if the cooperative transportation information belongs to a non-dangerous region or normal region side in the cooperative transporting job relative to the threshold value, the degree of danger may be calculated to a low value.

In the above-mentioned various embodiments, descriptions have been given by exemplifying a robot arm; however, not limited to the arm, the present invention can be applied to a moving robot by the use of wheels, a two-feet walking robot, a multi-feet walking robot, or the like, and the same effects can be obtained in association with contact between the moving robot or the like and a person.

By properly combining the arbitrary embodiments of the aforementioned various embodiments, the effects possessed by the embodiments can be produced.

INDUSTRIAL APPLICABILITY

The present invention is effectively applied to a control device for a robot arm that controls operations of a robot arm of a robot such as a house-service robot that is possibly made in contact with a person, and a controlling method thereof, as well as a robot having a control device for a robot arm and a control program and an integrated electronic circuit for such a robot arm. Moreover, not limited to the house-service robot, the present invention is also applicable to an industrial robot, a control device and a control method for a robot arm of a moving mechanism in a production facility or the like and a robot having a control device for a robot arm, as well as a control program and an integrated electronic circuit for such a robot arm.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A control device for a robot arm, the device comprising:
a working posture information acquiring means for acquiring working posture information on a working posture of a person cooperating with the robot arm when the person and the robot arm transport an object in cooperation with each other;
a degree-of-danger calculating means for calculating a degree of danger caused when the person is transporting the object, based on the working posture information acquired by the working posture information acquiring means;
a rigidity control means for controlling rigidity of the robot arm so as to be increased as the degree of danger calculated by the degree-of-danger calculating means becomes greater; and
an impedance setting means for setting a mechanical impedance set value of the robot arm to a greater value as the degree of danger calculated by the degree-of-danger calculating means becomes greater, wherein
the rigidity control means controls the mechanical impedance value of the robot arm to the mechanical impedance set value set by the impedance setting means, and
the impedance setting means individually sets mechanical impedance set values in six dimensional directions including translation directions and a rotating direction of a hand position of the robot arm, based on the degree of danger upon transporting the object, and also respectively sets the mechanical impedance set values such that, by making the rigidity in the rotation direction higher than the rigidity in the translation direction of the hand position based on the degree of danger upon transporting the object, the object being transported by the robot arm is horizontally maintained.

2. A control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means; and a rigidity control means for controlling rigidity of the robot arm so as to be increased as the degree of danger calculated by the degree-of-danger calculating means becomes greater, wherein the working posture information includes a piece of information on an elbow joint angle on a side where the person is cooperating with the robot arm, and the degree-of-danger calculating means calculates the degree of danger so as to be a greater value as the elbow joint angle upon transporting the object becomes greater, while the degree-of-danger calculating means calculates the degree of danger so as to be a smaller value as the elbow joint angle becomes smaller.

3. A control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means; and a rigidity control means for controlling rigidity of the robot arm so as to be increased as the degree of danger calculated by the degree-of-danger calculating means becomes greater, wherein the working posture information includes a piece of information on a hand position on a side where the person is cooperating with the robot arm, and a piece of information on a sternum upper edge height corresponding to a height from a sternum of the person to a floor surface, and the degree-of-danger calculating means calculates the degree of danger so as to be a greater value as a height of the hand position becomes higher than the sternum upper edge height, while the degree-of-danger calculating means calculates the degree of danger so as to be a smaller value as the height of the hand position becomes lower than the sternum upper edge height.

4. A control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means; and a rigidity control means for controlling rigidity of the robot arm so as to be increased as the degree of danger calculated by the degree-of-danger calculating means becomes greater, wherein the working posture information includes a piece of information on center-of-gravity coordinates of the person cooperating with the robot arm, and a piece of information on a supporting base bottom face serving as a supporting face of the person on a floor surface, and the degree-of-danger calculating means determines whether or not the center-of-gravity coordinates of the person are located within a range of the supporting base bottom face of the person, and when the center-of-gravity coordinates are located out of the range, the degree-of-danger calculating means calculates the degree of danger so as to be a greater value as a distance from the center-of-gravity coordinates of the person to the supporting base bottom face becomes larger.

5. A control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means; and a rigidity control means for controlling rigidity of the robot arm so as to be increased as the degree of danger calculated by the degree-of-danger calculating means becomes greater, wherein the working posture information includes a piece of information on a dominant hand of the person cooperating with the robot arm, and the degree-of-danger calculating means determines whether or not the person is operating the robot arm with the dominant hand, and when the person is operating with the dominant hand, calculates the degree of danger so as to be a value smaller than a value in a case where the person is operating without using the dominant hand.

6. A control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means;

a rigidity control means for controlling rigidity of the robot arm so as to be increased as the degree of danger calculated by the degree-of-danger calculating means becomes greater, and further comprising:

a body condition information acquiring means for acquiring body condition information on body conditions of the person cooperating with the robot arm when the person and the robot arm transport the object in cooperation with each other, wherein the degree-of-danger calculating means calculates the degree of danger of the person upon transporting the object based on the working posture information and the body condition information;

the working posture information acquiring means acquires object characteristic information on object characteristics of the object being transported by the robot arm; and the impedance setting means sets a mechanical impedance set value of the robot arm based on the degree of danger upon transporting the object and the object characteristic information, and respectively sets the mechanical impedance set values such that, by making a rigidity in a rotation direction higher than a rigidity in a translation direction of a hand position of the robot arm based on the degree of danger and the object characteristic information, the object being transported by the robot arm is horizontally maintained.

7. A control device for a robot arm, the device comprising:

a working posture information acquiring means for acquiring working posture information on a working posture of a person cooperating with the robot arm when the person and the robot arm transport an object in cooperation with each other;

a degree-of-danger calculating means for calculating a degree of danger caused when the person is transporting the object, based on the working posture information acquired by the working posture information acquiring means;

a rigidity control means for controlling rigidity of the robot arm so as to be increased as the degree of danger calculated by the degree-of-danger calculating means becomes greater, and further comprising:

a body condition information acquiring means for acquiring body condition information on body conditions of the person cooperating with the robot arm when the person and the robot arm transport the object in cooperation with each other, wherein the degree-of-danger calculating means calculates the degree of danger of the person upon transporting the object based on the working posture information and the body condition information;

the working posture information acquiring means acquires object characteristic information on object characteristics of the object being transported by the robot arm;

the impedance setting means sets the mechanical impedance set value of the robot arm based on the degree of danger upon transporting the object and the object characteristic information; and the object characteristic information includes at least one of pieces of information on physical characteristic on the object being transported by the robot arm and attribute information on the object, and the physical characteristic information on the object being transported by the robot arm includes at least one of pieces of weight information on the object being transported by the robot arm, dimension information on the object, hardness information on the object, and position and posture constraint condition information on the object, while the attribute information on the object includes at least one of pieces of degree of sharpness information on the object being transported by the robot arm and degree of importance information on the object being transported by the robot arm.

* * * * *